United States Patent
Okada et al.

(10) Patent No.: US 9,762,786 B2
(45) Date of Patent: Sep. 12, 2017

(54) IMAGE PICKUP DEVICE, LIGHT PROJECTION DEVICE, BEAM LIGHT CONTROL METHOD, AND PROGRAM

(71) Applicant: SONY CORPORATION, Tokyo (JP)

(72) Inventors: Shunji Okada, Kanagawa (JP); Kentaro Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 14/636,375

(22) Filed: Mar. 3, 2015

(65) Prior Publication Data
US 2015/0264236 A1 Sep. 17, 2015

(30) Foreign Application Priority Data

Mar. 11, 2014 (JP) ................................ 2014-047702

(51) Int. Cl.
| | |
|---|---|
| H04N 5/225 | (2006.01) |
| G03B 17/56 | (2006.01) |
| H04N 5/33 | (2006.01) |
| H04N 5/235 | (2006.01) |
| G03B 15/05 | (2006.01) |
| H04N 5/232 | (2006.01) |
| G08B 13/196 | (2006.01) |

(52) U.S. Cl.
CPC ........... *H04N 5/2256* (2013.01); *G03B 15/05* (2013.01); *G03B 17/561* (2013.01); *H04N 5/2354* (2013.01); *H04N 5/23241* (2013.01); *H04N 5/33* (2013.01); *G08B 13/19695* (2013.01)

(58) Field of Classification Search
CPC ... H04N 5/2256; H04N 5/23241; H04N 5/332
See application file for complete search history.

(56) References Cited

U.S. PATENT DOCUMENTS

| | | | | |
|---|---|---|---|---|
| 6,122,445 | A * | 9/2000 | Yamada | G08B 13/19626 348/E5.042 |
| 2007/0252805 | A1* | 11/2007 | Shuy | G09G 3/3406 345/102 |
| 2008/0106637 | A1* | 5/2008 | Nakao | H04N 5/2256 348/371 |
| 2008/0246844 | A1* | 10/2008 | Chan | F21K 9/13 348/152 |
| 2009/0262189 | A1* | 10/2009 | Marman | G08B 13/19613 348/143 |

FOREIGN PATENT DOCUMENTS

| | | | |
|---|---|---|---|
| JP | 3548733 B | 4/2004 | |
| JP | 3677987 B | 5/2005 | |

* cited by examiner

*Primary Examiner* — Ahmed A Berhan
(74) *Attorney, Agent, or Firm* — Chip Law Group

(57) ABSTRACT

There is provided an image pickup device including an image pickup unit, and a beam light control unit configured to control a state of a beam light based on living body detection information given by a living body detection unit.

15 Claims, 18 Drawing Sheets

FIG. 10

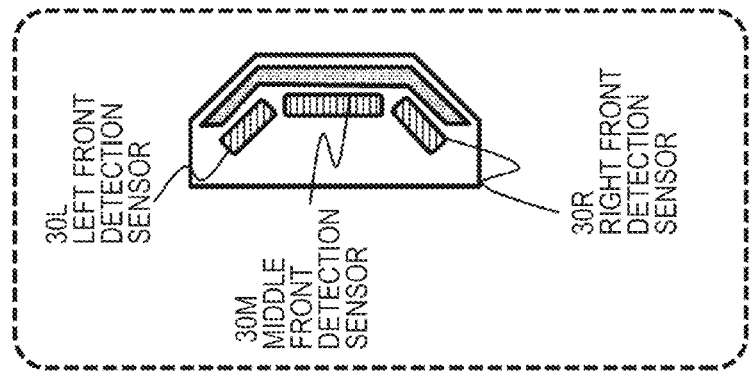

| SETTING OF WINDOW/SENSOR SENSITIVITY | (1) MANNER MODE | (2) POWER SAVING MODE (WIDE) | (3) POWER SAVING MODE (TELE) |
|---|---|---|---|
| | SET TRANSMISSION WINDOW UNDER LR (LEFT AND RIGHT) SENSORS/SHORT DISTANCE DETECTION MODE = LOW DETECTION SENSITIVITY | SET TRANSMISSION WINDOW IN FRONT OF M (MIDDLE) SENSOR (LONG DISTANCE DETECTION MODE) = HIGH DETECTION SENSITIVITY | SET TRANSMISSION WINDOW IN FRONT OF M (MIDDLE) SENSOR (LONG DISTANCE DETECTION MODE) = HIGHEST DETECTION SENSITIVITY |
| LEFT FRONT DETECTION SENSOR | [waveform] | NOT USED | NOT USED |
| MIDDLE FRONT DETECTION SENSOR | NOT USED | [waveform] | [waveform] |
| RIGHT FRONT DETECTION SENSOR | [waveform] | NOT USED | NOT USED |

IMAGE PICKUP DEVICE, LIGHT PROJECTION DEVICE, BEAM LIGHT CONTROL METHOD, AND PROGRAM

CROSS REFERENCE TO RELATED APPLICATIONS

This application claims the benefit of Japanese Priority Patent Application JP 2014-047702 filed Mar. 11, 2014, the entire contents of which are incorporated herein by reference.

BACKGROUND

The present disclosure relates to an image pickup device, a light projection device, a beam light control method, and a program. Specifically, the present disclosure relates to an image pickup device which irradiates an image to be photographed by a camera with a spotlight, a light projection device, a beam light control method, and a program.

For example, an image is photographed with an image pickup device, such as a video camera, while irradiating a specific subject region, such as a face of a person, with a spotlight, whereby an image in which the specific subject is conspicuous can be photographed.

As former techniques which disclose a device of photographing an image while performing light irradiation, JP 3548733B, JP 3677987B, and the like are mentioned.

JP 3548733B discloses a configuration of controlling an inner gimbal of a camera platform using a gyroscope built-in the camera.

JP 3677987B discloses a subject tracking configuration by lighting based on a user's direction.

Specific examples of photographing an image while irradiating a subject with light include a configuration of photographing an image while applying a spotlight to the subject in, for example, studio photographing or the like, a monitoring camera of tracking a specific subject with lighting, and then photographing an image of the specific subject, and the like.

SUMMARY

In the case of photographing an image with irradiation of a spotlight, when the eyes of a person other than a person to be imaged, e.g., a passerby and the like, is irradiated with the spotlight, the person sometimes feels dazzled.

Moreover, the power consumption of a beam light which is light for the spotlight irradiation is high. Therefore, when considering the consumption of a battery, it is preferable to emit light according to necessary subject photographing timing and turning off the light or dimming the light in a period of time other than the necessary subject photographing timing.

The present disclosure has been made in view of the above-described problems, for example, and aims at providing an image pickup device, a light projection device, a beam light control method, and a program in which, in the configuration of photographing an image by spotlight irradiation, the light quantity of the spotlight is reduced when a person passes in front of a spotlight emitting unit or light emission thereof is controlled according to photographing timing.

According to a first aspect of the present disclosure, there is provided an image pickup device including an image pickup unit, and a beam light control unit configured to control a state of a beam light based on living body detection information given by a living body detection unit.

According to an embodiment of the present disclosure, the image pickup device further includes a living body detection control unit configured to change a sensor detection region of the living body detection unit.

Further, according to an embodiment of the present disclosure, the living body detection control unit may set the sensor detection region to at least one of a left front region and a right front region of the image pickup device.

Further, according to an embodiment of the present disclosure, when the living body detection information shows detection of a living body, the beam light control unit may set a direction of the beam light in a direction different from a direction in which the living body is detected.

Further, according to an embodiment of the present disclosure, when the living body detection information shows detection of a living body, the beam light control unit may stop light emission of the beam light or may reduce a light emission level of the beam light.

Further, according to an embodiment of the present disclosure, the living body detection control unit may set a sensor detection level of the living body detection unit to be less than predetermined sensitivity.

Further, according to an embodiment of the present disclosure, the living body detection control unit may set the sensor detection region to a middle front region of the image pickup device.

Further, according to an embodiment of the present disclosure, when the living body detection information shows detection of a living body, the beam light control unit may start light emission of the beam light or increases a light emission level of the beam light.

Further, according to an embodiment of the present disclosure, the living body detection control unit may set a sensor detection level of the living body detection unit to be higher than predetermined sensitivity.

Further, according to an embodiment of the present disclosure, the living body detection unit may be constituted by a far-infrared light detection sensor.

Further, according to an embodiment of the present disclosure, the living body detection unit may have a far-infrared light filter capable of controlling a transmission region of far-infrared light in front of the far-infrared light detection sensor.

Further, according to an embodiment of the present disclosure, the image pickup device may further include a living body detection control unit configured to change the transmission region of the far-infrared light filter.

Further, according to an embodiment of the present disclosure, the living body detection control unit may set the sensor detection region to be wider in a wide mode than in a tele-mode by controlling the transmission region of the far-infrared light filter.

Further, according to an embodiment of the present disclosure, the image pickup device may further include a light dimming condition judgment unit configured to determine an upper limit of a light emission level of the beam light according to a subject distance.

Further, according to an embodiment of the present disclosure, the living body detection control unit may change the sensor detection region according to a mode of a manner mode or a power saving mode.

Further, according to a second aspect of the present disclosure, there is provided a light projection device including a beam light configured to emit light. A state of the beam light is controlled based on living body detection information given by a living body detection unit.

Further, according to a third aspect of the present disclosure, there is provided a beam light control method including controlling a state of beam light based on living body detection information given by a living body detection unit.

Further, according to a fourth aspect of the present disclosure, there is provided a non-transitory computer readable medium storing a program causing a computer to execute a method of controlling a beam light control apparatus, the method including controlling a state of beam light based on living body detection information given by a living body detection unit.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The aim, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

BRIEF DESCRIPTION OF THE DRAWINGS

FIG. 10 is a view for explaining a setting of the living body detection sensor and a detection example in each mode;

DETAILED DESCRIPTION OF THE EMBODIMENT(S)

Hereinafter, the details of an image pickup device, a light projection device, a beam light control method, and a program according to an embodiment of the present disclosure are described with reference to the drawings. The description is given according to the following items.

1. Outline of configuration and processing of image pickup device
2. Configuration and processing of living body detection sensor
3. Configuration example of image pickup device
4. Processing sequence performed by image pickup device according to embodiment of present disclosure
4-1. Processing sequence example when manner mode is set
4-2. Processing sequence example when power saving mode is set
5. Conclusion of configuration according to embodiment of present disclosure

[1. Outline of Configuration and Processing of Image Pickup Device]

First, the outline of the configuration and the processing of an image pickup device according to an embodiment of the present disclosure is described with reference to FIG. 1 and the following drawings.

Figure 1:
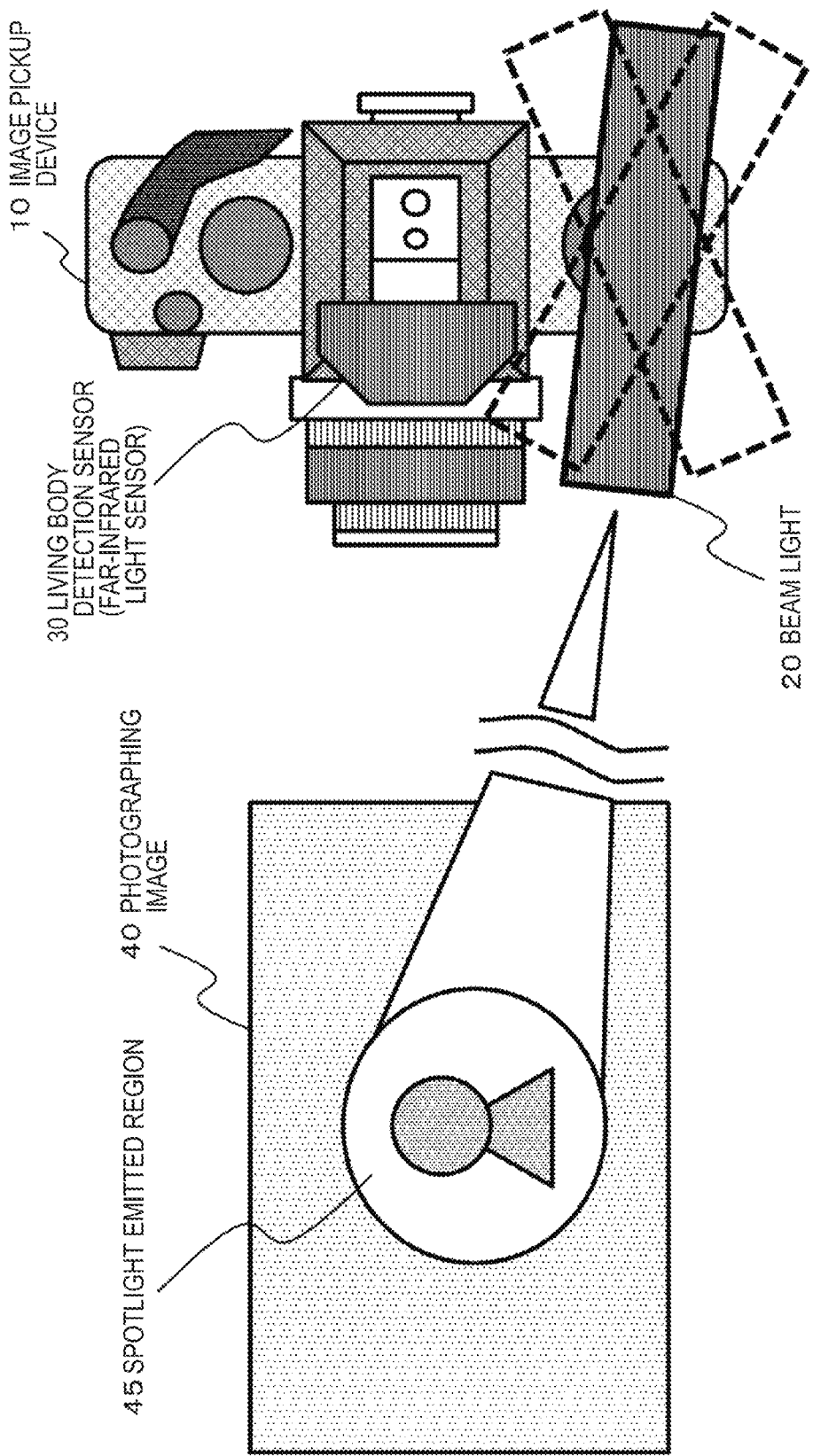
FIG. 1 is a view for explaining the configuration of an image pickup device.

As illustrated in FIG. 1, an image pickup device 10 according to an embodiment of the present disclosure has a beam light 20 and has a configuration of irradiating a part of a subject in a photographing image 40 with a spotlight. A spotlight emitted region 45 of the photographing image 40 becomes brighter than other image regions of the photographing image 45, so that an image in which the subject in the spotlight emitted region 45 is conspicuous can be photographed.

The image pickup device 10 is, for example, a camera capable of photographing both a still image and a moving image. The image pickup device 10 photographs an image while irradiating a specific region with a spotlight by turning on the beam light 20 in photographing a still image or a moving image. The beam light 20 is constituted by a white light emitting LED, for example.

The beam light 20 can control the emitting direction of the spotlight by controlling the directivity angle. The spotlight emitted region can be controlled to extend and decrease by controlling the light distribution angle.

The image pickup device 10 further has a living body detection sensor 30. The living body detection sensor 30 is constituted by a far-infrared light sensor, for example, and detects a far-infrared light output from a living body, and then outputs a living body detection signal when living things, such as human beings and animals, approach the sensor.

Figure 2:
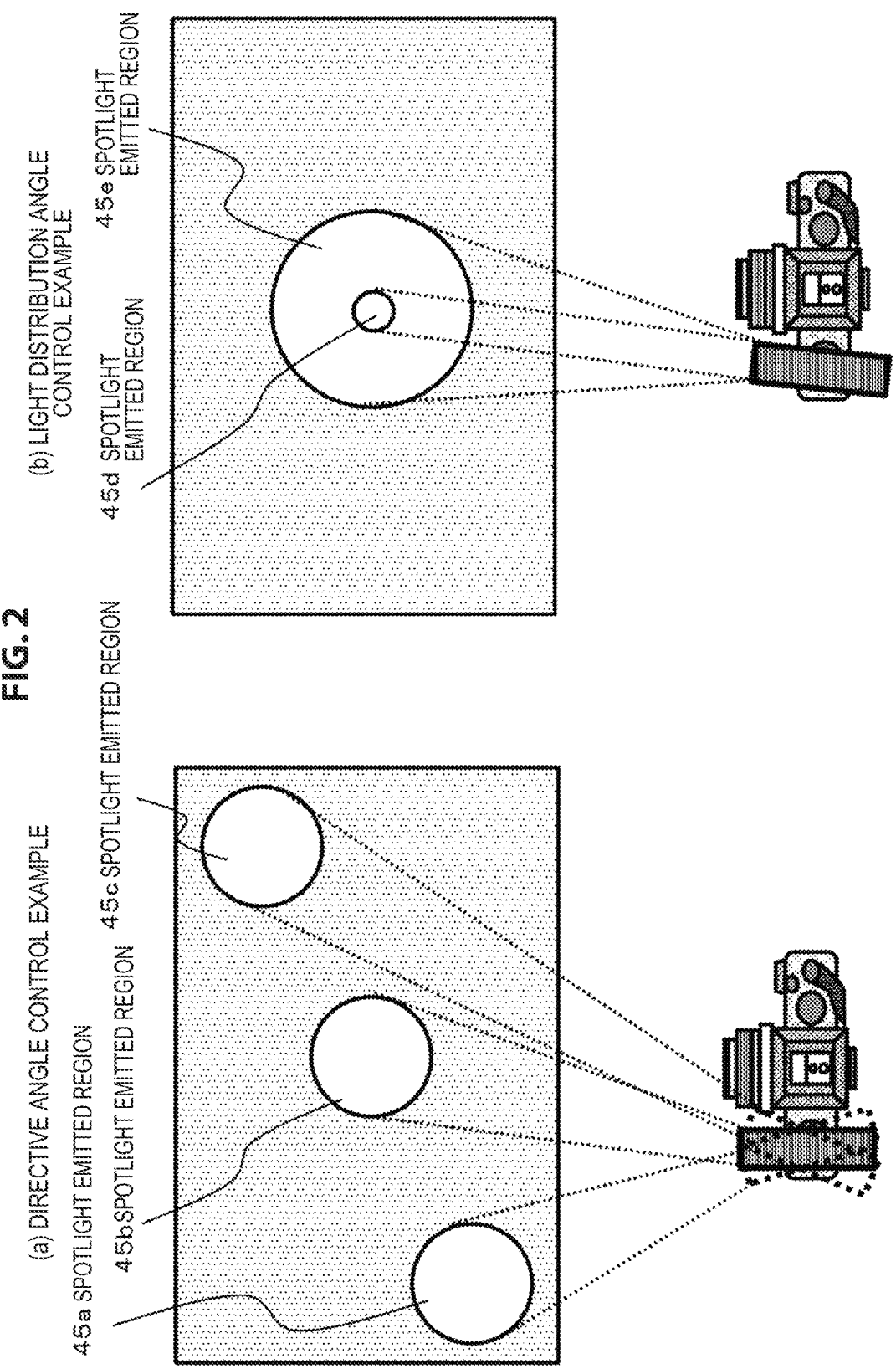
FIG. 2 includes FIGS. 2(a) and 2(b) for explaining a control example of a beam light.

FIG. 2 are views illustrating an example of directivity angle control (a) of the beam light 20 and an example of light distribution angle control (b) of the beam light 20. The directivity angle control (a) is processing of controlling the spotlight emitting direction as illustrated in FIG. 2(a). The beam light 20 is configured to be able to be driven as desired in the three axial directions of the X axis (Pitch), the Y axis (Yaw), and the Z axis (Roll) and can emit a spotlight in a desired direction. FIG. 2(a) illustrates three examples of spotlight emitted regions 45a to 45c and the spotlight emitted region can be set in a desired region insofar as the region is within the drive range of the beam light 20. Details of the drive configuration of the beam light 20 are described in the latter part.

(b) The light distribution angle control is control of changing the size of the spotlight, i.e., the size of the spotlight emitted region, as illustrated in FIG. 2(b). The light distribution angle is controlled by controlling an optical lens which controls the spread of a light source of the beam light.

FIG. 2(b) illustrates two spotlight emitted regions 45d and 45e different in size set by the light distribution angle control. Thus, when the region is within the light distribution angle controllable range of the beam light 20, the spotlight emitted region of a desired size can be set. The light distribution angle of the beam light can be controlled in the range of 6° to 25°.

The control of the directivity angle and the light distribution angle of the beam light 20 can be performed by an input of a user's direction. The user's direction is performed through an input unit of the image pickup device 10, for example.

[2. Configuration and Processing of Living Body Detection Sensor]

Next, an example of the configuration and processing of a living body detection sensor 30 is described with reference to FIG. 3 and the following drawings.

The beam light 20 emits a relatively strong light as the spotlight. Therefore, when the spotlight is emitted to the eyes of a person other than a person to be photographed, e.g., a passerby and the like, the person sometimes feels dazzled.

Moreover, the power consumption of a beam light which is light for the spotlight irradiation is high. Therefore, when considering the consumption of a battery, it is preferable to emit light according to necessary subject photographing timing and turning off the light or dimming the light in a period of time other than the necessary subject photographing timing.

Figure 3:
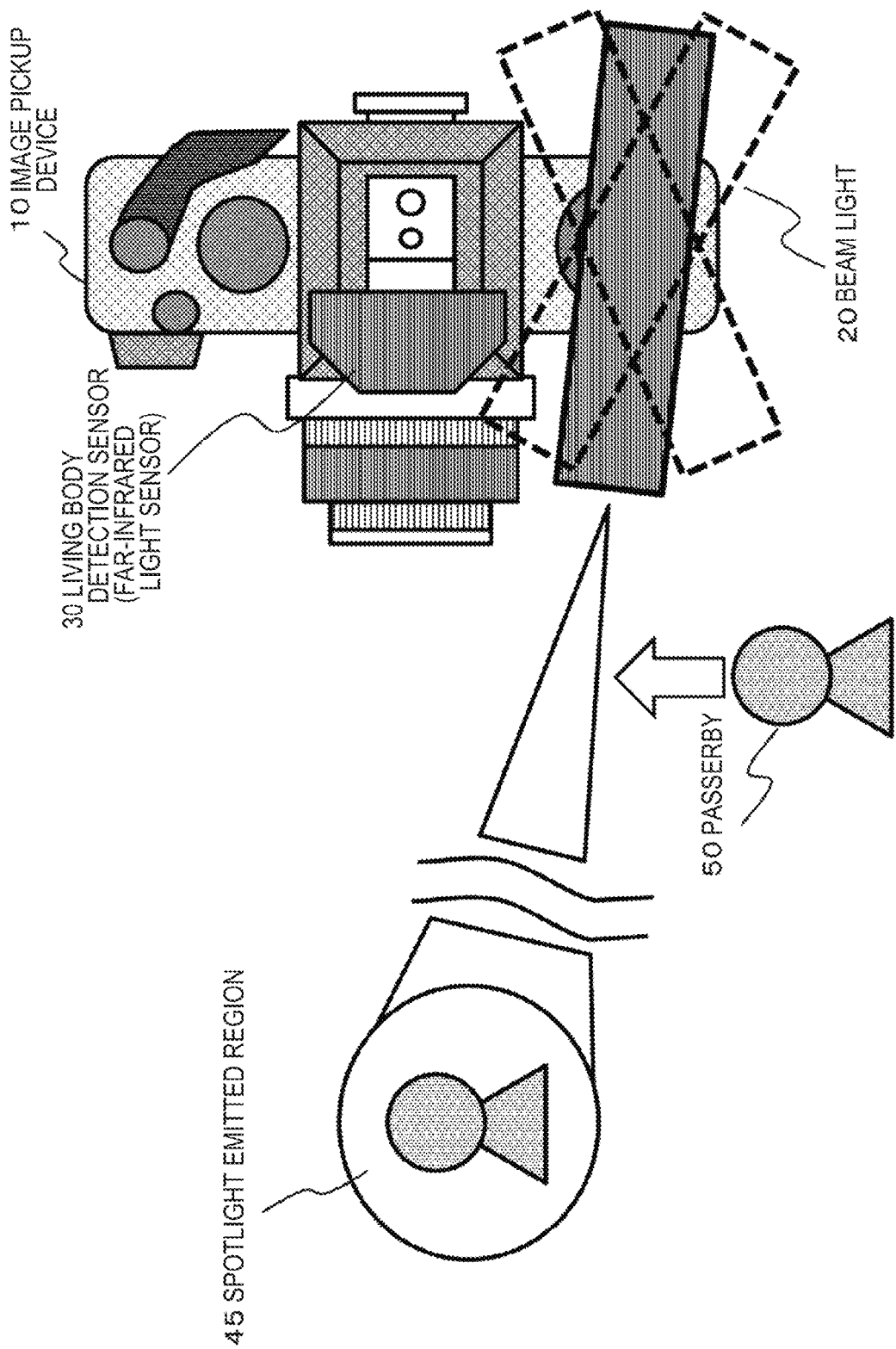
FIG. 3 is a view for explaining an example of control processing of a beam light utilizing detection information of a living body detection sensor.

FIG. 3 illustrates an example when a passerby 50 passes in front of the image pickup device 10. The passerby 50 passes a region irradiated with a spotlight emitted from the beam light 20. When the passerby 50 directly looks at the beam light 20, for example, in such a state, the passerby 50 feels dazzled.

In order to prevent such a situation, the living body detection sensor 30 detects that the passerby 50 approaches. The beam light control unit controls the light in such a manner as to stop or reduce the light emission of the beam light 20 based on the detection signal.

Figure 4:
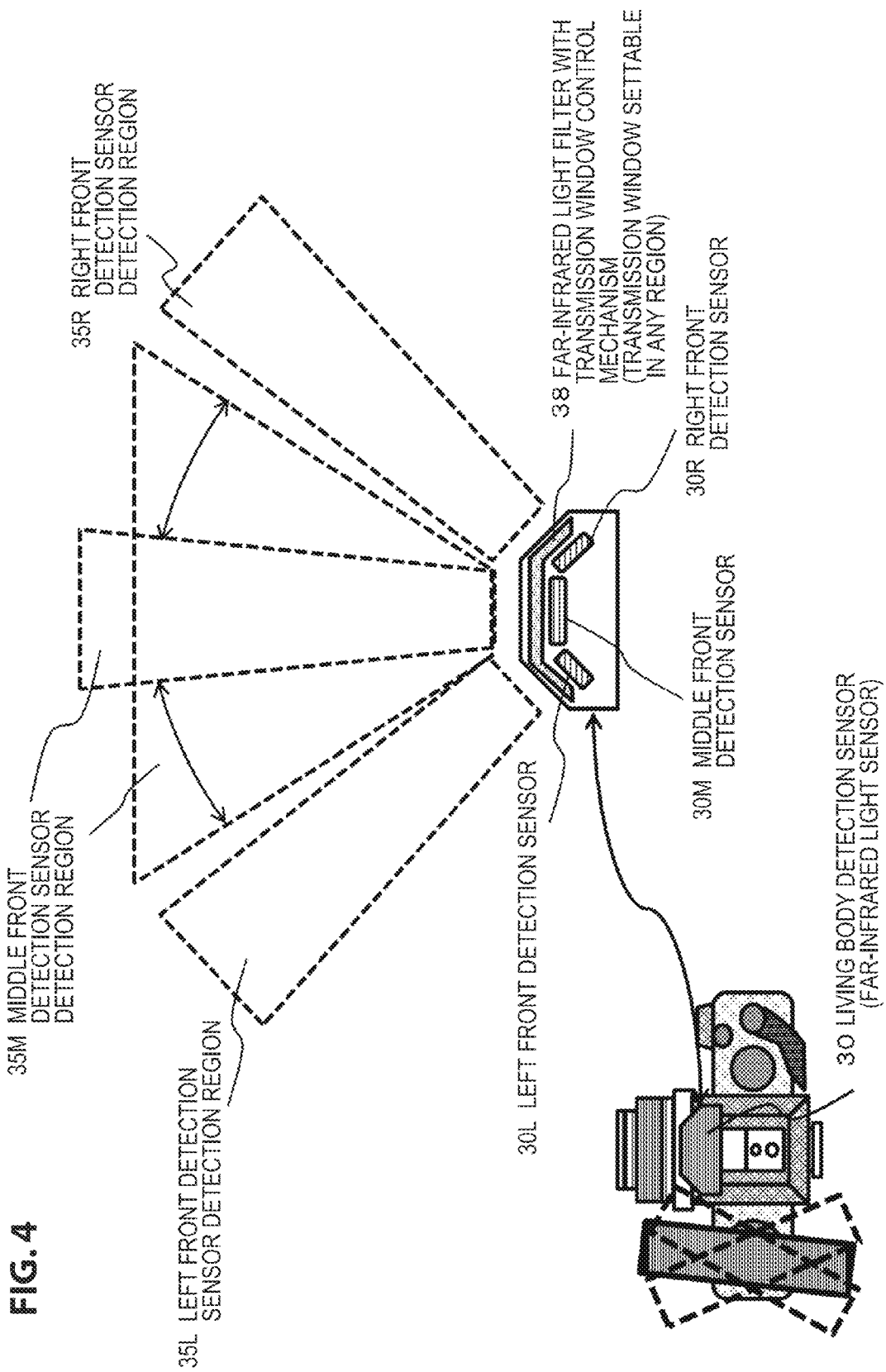
FIG. 4 is a view for explaining the configuration of the living body detection sensor and a setting example of a detection region.

FIG. 4 is a view for explaining an example of the configuration and a living body detection region of the living body detection sensor 30.

The living body detection sensor 30 has three independent sensors therein. More specifically, the three sensors include a left front detection sensor 30L, a middle front detection sensor 30M, and a right front detection sensor 30R.

The detection regions of these three sensors are dotted frame regions illustrated in FIG. 4.

A living body detection region of the left front detection sensor 30L is a left front detection sensor detection region 35L illustrated in FIG. 4.

A living body detection region of the right front detection sensor 30R is a right front detection sensor detection region 35R illustrated in FIG. 4.

A living body detection region of the middle front detection sensor 30M is a middle front detection sensor detection region 35M illustrated in FIG. 4.

FIG. 4 illustrates two different regions as the middle front detection sensor detection region 35M. This shows that the living body detection region can be adjusted by control of a far-infrared light filter with transmission window control mechanism 38 provided in front of the three sensors 30L, 30M, and 30R.

Although FIG. 4 illustrates two regions only for the middle front detection sensor detection region 35M, the detection regions of the other sensors can also be set as desired by the control of the far-infrared light filter with transmission window control mechanism 38.

The far-infrared light filter with transmission window control mechanism 38 is configured so that the transmission region (window) of far-infrared light can be set at a desired position. More specifically, the transmission region can be set at a desired position based on the control of the sensor control unit. By the control, the detection regions set in front of the three sensors 30L, 30M, and 30R can also be set as desired.

Figure 5:
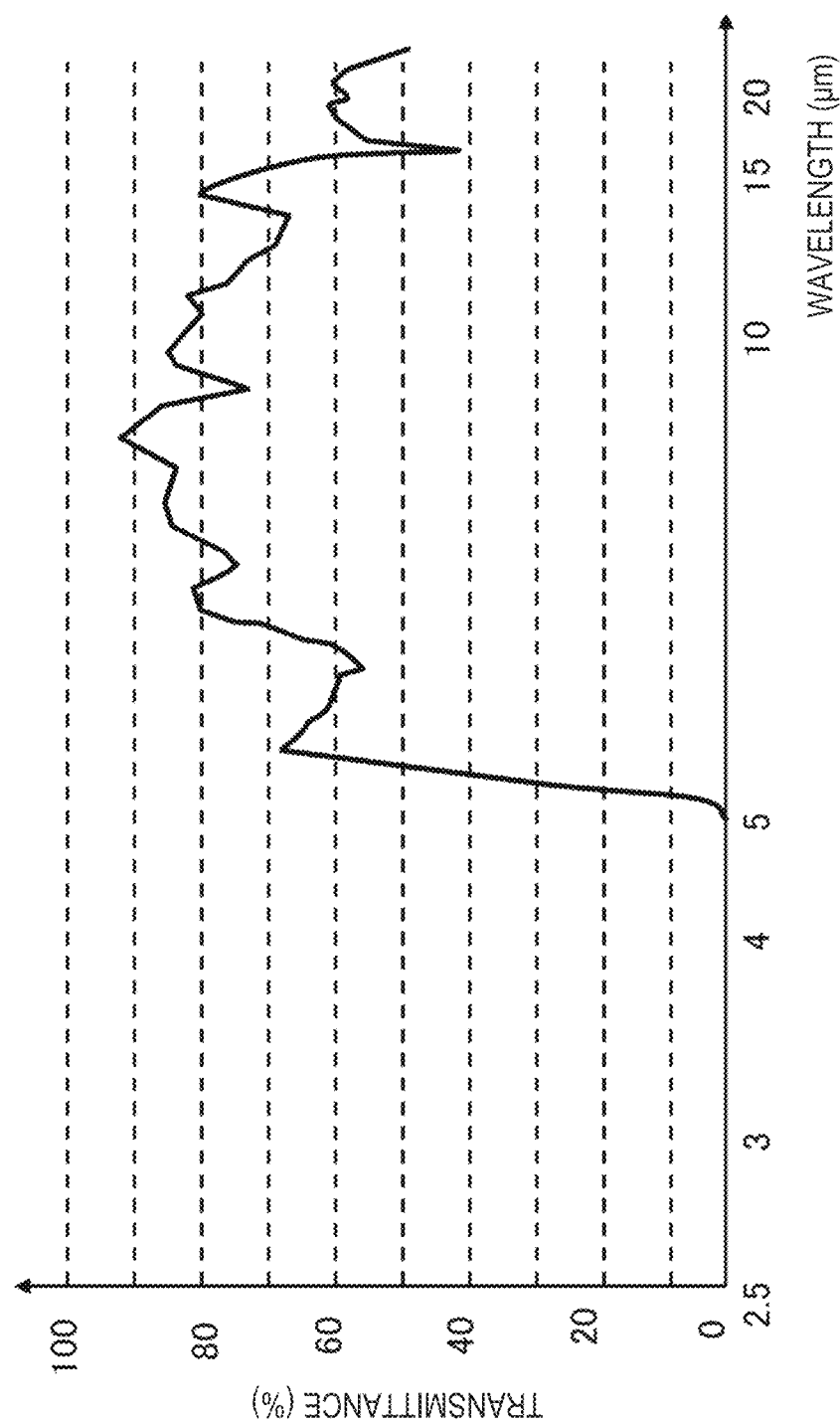
FIG. 5 is a view for explaining the properties of an infrared light filter.

FIG. 5 is a view illustrating the transmittance of the far-infrared light of the far-infrared light filter with transmission window control mechanism 38.

The far-infrared light is about 5 to 20 μm wavelength light and is a wavelength light usually output from living things having a body temperature, and is used as a detection signal in a human detection sensor and the like.

The far-infrared light filter with transmission window control mechanism 38 allows transmission of about 5 to 20 μm far-infrared light as illustrated in FIG. 5 in the set transmission region (window) to cause the sensor to detect the far-infrared light.

In a portion where the transmission region (window) is not set, far-infrared light does not transmit, and thus sensor detection is not performed.

Figure 6:
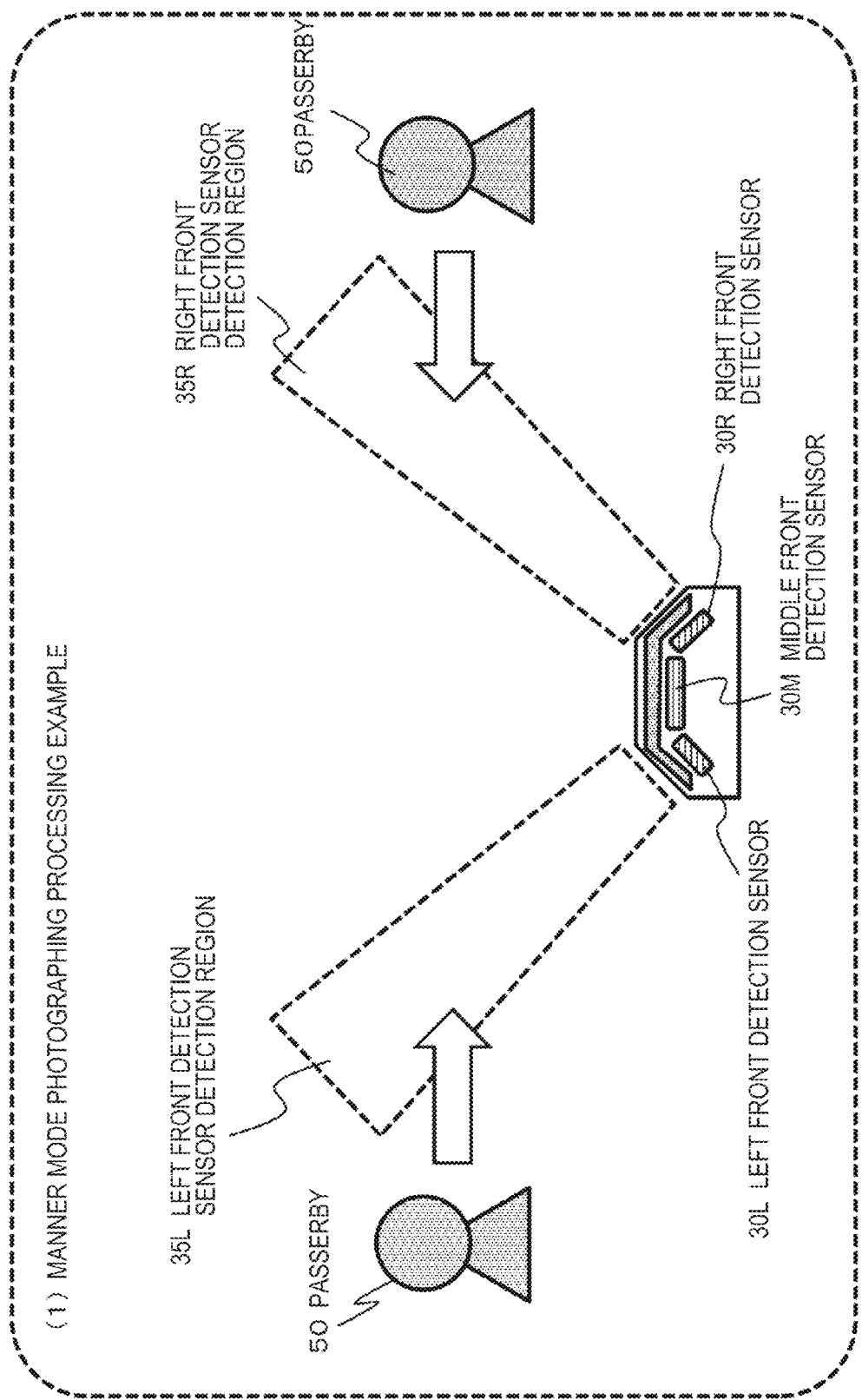
FIG. 6 is a view for explaining an example of photographing processing in a manner mode.

FIG. 6 is a view illustrating a utilization example of the living body detection sensor 30 in manner-mode photographing processing.

The manner mode is a mode of detecting that a person other than a subject approaches the image pickup device, e.g., a case where the passerby 50 passes in front of the image pickup device, in a state where an image is photographed while emitting a spotlight by the beam light 20, and then stopping the light emission of the beam light 20 or reducing the light emission level thereof In the manner mode, the left front detection sensor 30L and the right front detection sensor 30R of the living body detection sensor 30 are validated, i.e., a living body can be detected. The middle front detection sensor 30M is not used.

In the case where there is the passerby 50 who approaches from the left side of the image pickup device 10, when the passerby 50 comes into the detection range of the left front detection sensor 30L, a detection signal is output from the left front detection sensor 30L.

On the other hand, in the case where there is the passerby 50 who approaches from the right side of the image pickup device 10, when the passerby 50 comes into the detection range of the right front detection sensor 30R, a detection signal is output from the right front detection sensor 30R.

Thus, when a person approaches from either the right side or the left side, a detection signal can be output, so that, before the passerby 50 receives the emitted light of the beam light 20, the light emission of the beam light 20 can be stopped or the light emission level thereof can be reduced.

Figure 7:
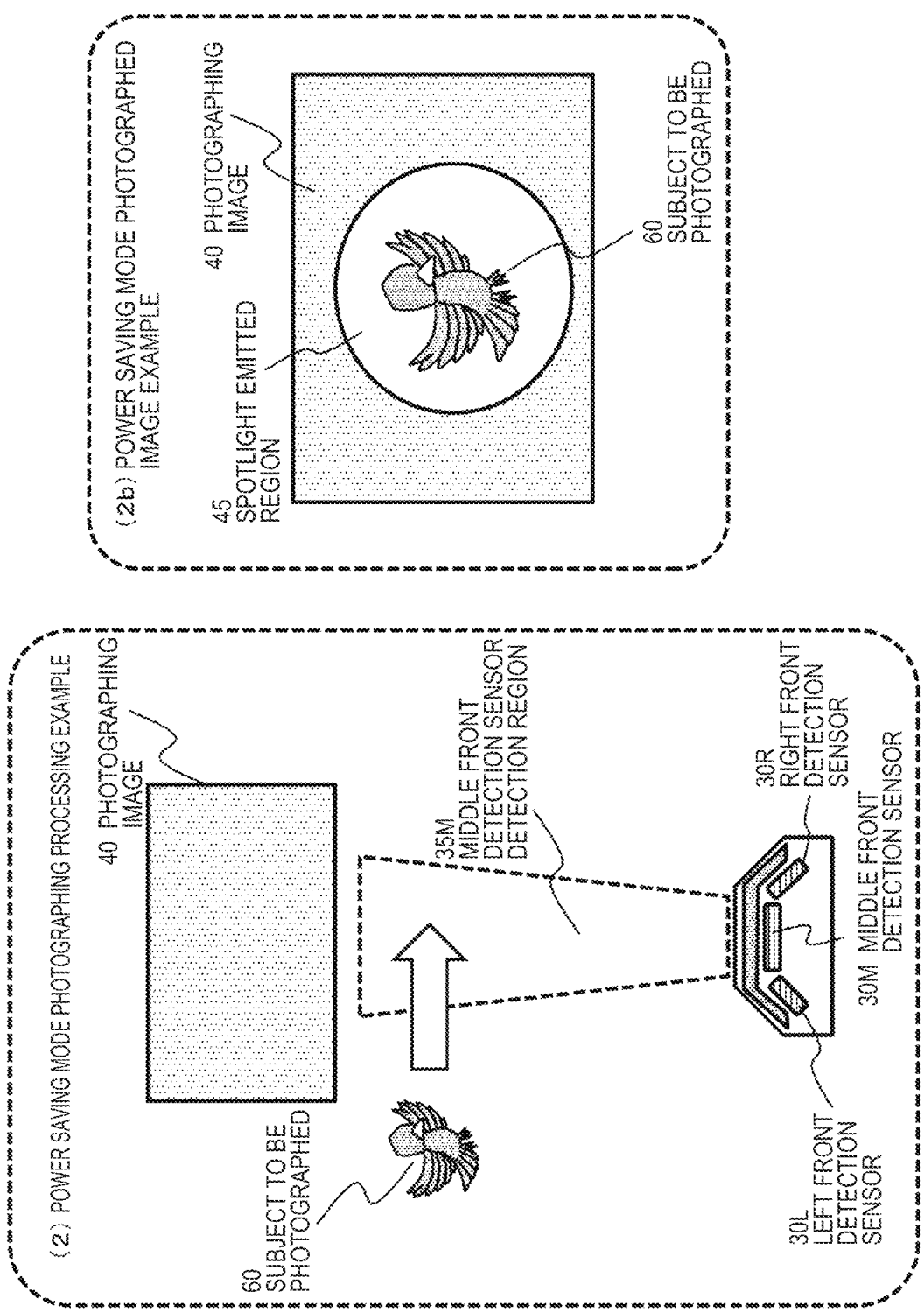
FIG. 7 are views for explaining an example of photographing processing in a power saving mode.

FIG. 7 are views illustrating a utilization example of the living body detection sensor 30 in power saving-mode photographing processing.

The power saving mode is a mode of performing spotlight emission by the beam light 20 or increasing the light emission intensity (level) when a subject to be photographed by the image pickup device 10, i.e., a target subject, comes into a photographing range. More specifically, the power saving mode is a mode of stopping the spotlight emission by the beam light 20 or reducing the light emission level when the target subject is without the photographing range to thereby suppress power consumption.

For example, the power saving mode is a mode which can be effectively utilized in photographing processing of animals in darkness and the like.

In the power saving mode, the middle front detection sensor 30M of the living body detection sensor 30 is validated, i.e., living body detection can be performed.

The left front detection sensor 30L and the right front detection sensor 30R are not used.

When there is a photographing target subject 60, such as an animal, which approaches the front of the image pickup device 10, i.e., a region where the subject can be photographed, and when the photographing target subject 60 comes into the detection range of the middle front detection sensor 30M, a detection signal is output from the middle front detection sensor 30M.

Based on the detection signal, a control unit of controlling the light emission of the beam light performs processing of starting the spotlight emission by the beam light 20 or increasing the light emission level.

By the processing, an image illustrated in FIG. 7 (2*b*) can be photographed, for example. More specifically, an image in which the photographing target subject 60 is taken in the spotlight emitted region 45 can be photographed.

Figure 8:
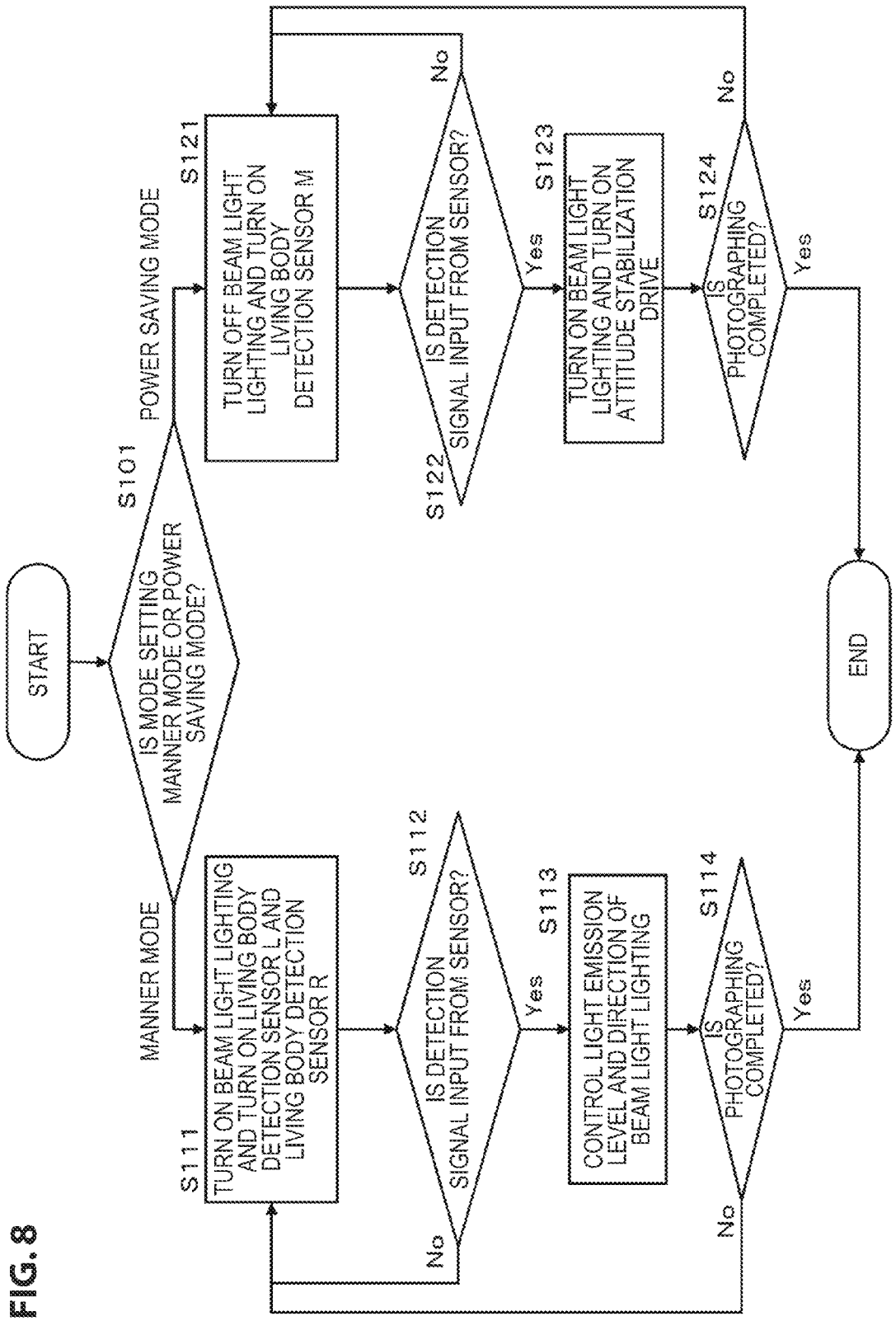
FIG. 8 is a view showing a flow chart for explaining the outline of a processing sequence in each of the manner mode and the power saving mode.

FIG. 8 is a flow chart for explaining the outline of a processing sequence when photographing an image utilizing the living body detection sensor 30.

The processing shown in the flow is performed under the control of the control unit of the image pickup device. For example, the processing is performed according to a program stored in a storage unit.

The flow shown in FIG. 8 is a flow showing the outline of the processing in each mode. A specific detailed sequence is described with reference to sequence diagrams of FIG. 15 and the following drawings.

First, in Step S101, it is judged whether the setting mode of the image pickup device is the manner mode or the power saving mode. The mode is set by a user's input to the input unit of the image pickup device.

When the setting mode is the manner mode, the processing proceeds to Step S111. On the other hand, when the setting mode is the power saving mode, the processing proceeds to Step S121. First, processing when the setting mode is the manner mode is described.

In Step S111, light emission is started by turning the beam light 20 ON, and then validating LR (left and right) sensors of the living body detection sensor 30. More specifically, the left front region and the right front region of the image pickup device 10 are set as living body detection regions as described with reference to FIG. 6.

When a living body detection signal is input from the sensor in Step S112, the processing proceeds to Step S113.

In Step S113, emission of the beam light lighting is stopped or the light emission level is reduced. Or, the light distribution angle is limited, i.e., the beam light setting direction is controlled so that the light formed by the beam light 20 is not emitted in a direction in which the living body has been detected.

When it is judged that the photographing is completed in Step S114, the processing ends. When the photographing processing continues, the processing in and after Step S111 repeatedly continues.

Next, processing when the setting mode is the power saving mode is described. When the setting mode is the power saving mode, first, the beam light 20 is turned OFF and the light emission level is set to a low level and the M (middle) sensor of the living body detection sensor 30 is validated in Step S121. More specifically, the middle front region of the image pickup device 10 is set as the living body detection region as described with reference to FIG. 7. When a living body detection signal is input from the sensor in Step S122, the processing proceeds to Step S123.

In Step S123, processing of starting the light emission of beam light lighting or increasing the light emission level is performed. Furthermore, attitude stabilization control drive of maintaining the beam light 20 in the fixed direction is started. More specifically, the beam light setting direction is controlled so that the light formed by the beam light 20 is emitted in the direction in which the living body has been detected.

When it is judged that the photographing is completed in Step S214, the processing ends. When the photographing processing continues, the processing in and after Step S111 repeatedly continues.

Thus, in the manner mode, the beam light 20 is controlled so that strong light is not emitted in the direction detected by the living body detection sensor and, in the power saving mode, the beam light 20 is controlled so that a spotlight formed by the beam light 20 is emitted in the direction detected by the living body detection sensor.

Figure 15:
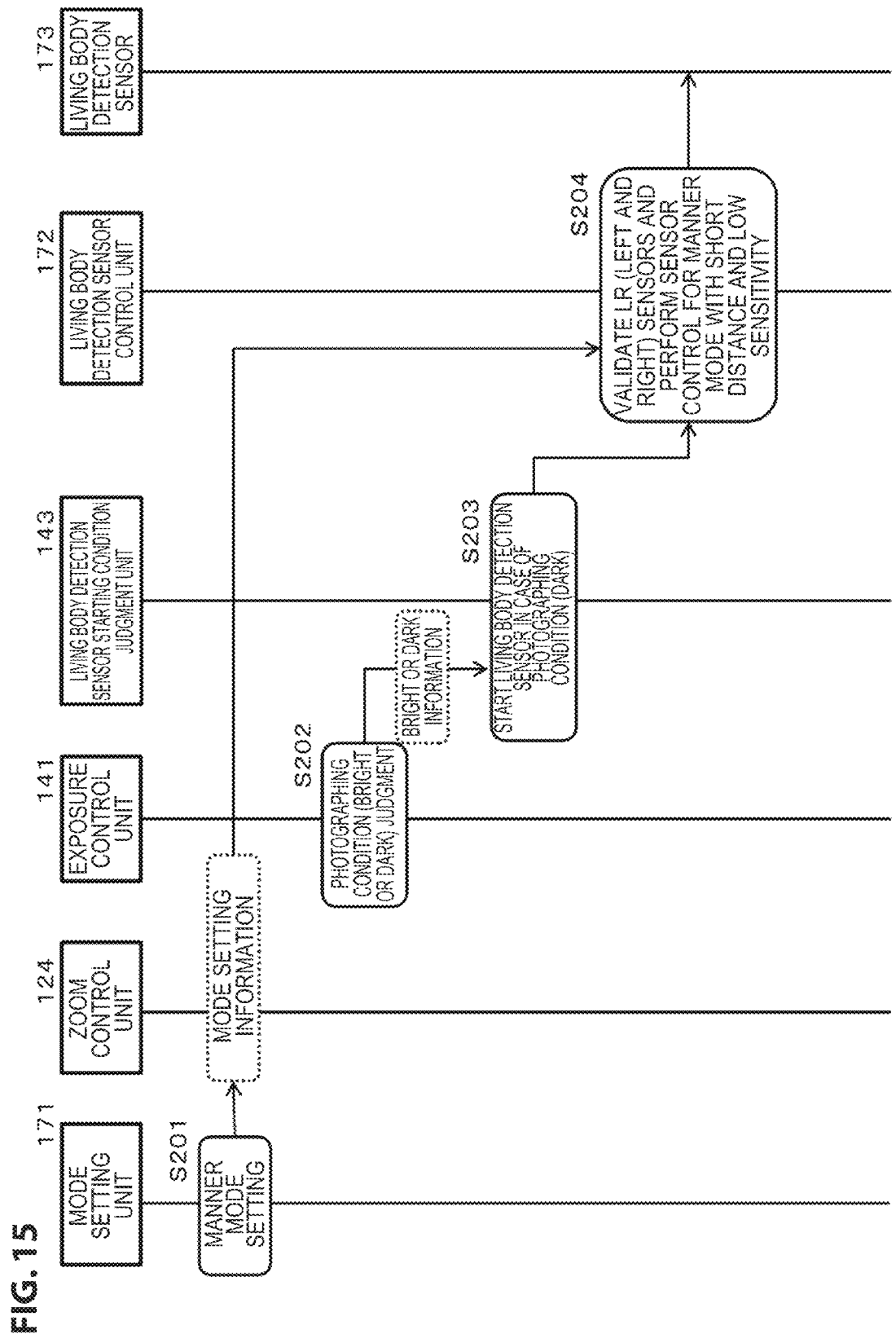
FIG. 15 is a sequence diagram for explaining processing performed by an image pickup device according to an embodiment of the present disclosure when the manner mode is set.

A more specific processing sequence is described in the latter part with reference to FIG. 15 and the following drawings.

The present technique can be applied not only to an image pickup device having both the manner mode and the power saving mode but to an image pickup device having only the manner mode, an image pickup device having only a mode other than the manner mode and the power saving mode, an image pickup device having only the power saving mode, and an image pickup device having a mode other than the power saving mode and the manner mode.

Figure 9:
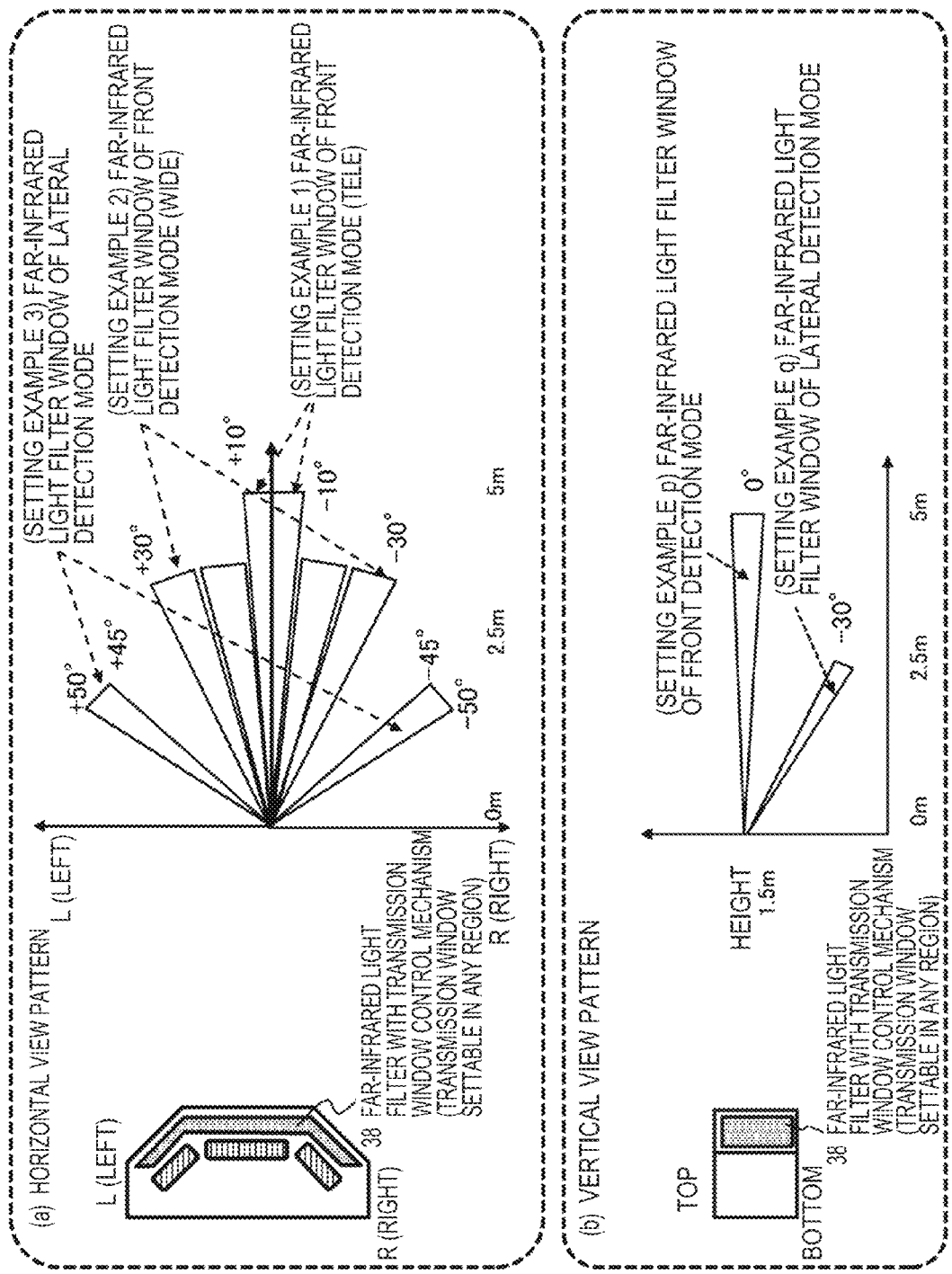
FIG. 9 includes FIGS. 9(a) and 9(b) for explaining a setting example of the detection region of the living body detection sensor.

FIG. 9 is a view for explaining a setting example of a sensor detection range by the far-infrared light filter with transmission window control mechanism 38 of the living body sensor 30.

As described above, the far-infrared light filter with transmission window control mechanism 38 is a filter capable of setting a transmission region (window) in a desired region.

FIG. 9(*a*) illustrates a setting example of a detection region in the horizontal direction. FIG. 9(*b*) illustrates a setting example of a detection region in the vertical direction.

In the setting example of a detection region in the horizontal direction of FIG. 9(a), three setting examples 1 to 3 are illustrated:

Setting example 1: Setting example of setting a region within a horizontal angle range of −10° to +10° in front of the image pickup device as the sensor detection region;

Setting example 2: Setting example of setting a region within a horizontal angle range of −30° to +30° in front of the image pickup device as the sensor detection region; and Setting example 3: Setting example of setting a region within a horizontal angle range of +45° to +50° in the left front of the image pickup device and a region within a horizontal angle range of −45° to −50° in the right front of the image pickup device as the sensor detection region.

The setting example 1 and the setting example 2 correspond to the sensor setting example in the power saving mode described with reference to FIG. 7.

The setting example 1 is equivalent to the sensor setting when the photographing setting is a tele-mode.

On the other hand, the setting example 2 is equivalent to the sensor setting when the photographing setting is a wide mode.

The setting example 3 is the sensor setting example in the manner mode described with reference to FIG. 6.

In the setting example of a detection region in the vertical direction of FIG. 9(b), two setting examples p and q are illustrated:

Setting Example p: Setting example of setting a region within a vertical angle range of about 0° in front of the image pickup device as the sensor detection region; and Setting Example q: Setting example of setting a region within a vertical angle (downward direction) range of about 30° in front of the image pickup device as the sensor detection region.

The setting example p corresponds to the sensor setting example in the power saving mode described with reference to FIG. 7.

The setting example q is the sensor setting example in the manner mode described with reference to FIG. 6.

More specifically, in the manner mode previously described with reference to FIG. 6, (Setting example 3) of FIG. 9(a) and (Setting Example q) of FIG. 9(b) are combined, so that the sensor is set in such a manner that regions within a range of −45° to −50° and +45° to +50° in the horizontal direction and about 30° in the vertically downward direction are set as the living body detection range.

On the other hand, in the power saving mode described with reference to FIG. 7, the sensor setting varies depending on the photographing mode, i.e., the tele-mode or the wide mode.

When the photographing mode is the tele-mode, (Setting Example 1) of FIG. 9(a) and (Setting Example p) of FIG. 9(b) are combined, so that the sensor is set in such a manner that a region within a range of −10° to +10° in the horizontal direction and about 0° in the vertically downward direction are set as the living body detection range.

When the photographing mode is the wide mode, (Setting Example 2) of FIG. 9(a) and (Setting Example q) of FIG. 9(b) are combined, so that the sensor is set in such a manner that a region within a range of −30° to +30° in the horizontal direction and about 0° in the vertically downward direction are set as the living body detection range.

The angle setting described with reference to FIG. 9 is an example and various angle settings can be performed by a user's setting, for example.

FIG. 10 shows a sensor setting aspect and an example of a detection signal in each mode setting.

(1) In the manner mode, the transmission window is set under the LR (left and right) sensors. A short distance detection mode is set, i.e., the detection level is set to low sensitivity.

FIG. 10 shows an example of a detection signal when the left front detection sensor has detected a living body.

(2) In the power saving mode (wide), the transmission window is set in front of the M (middle) sensor. A long distance detection mode is set, i.e., the detection level is set to high sensitivity.

FIG. 10 shows an example of a detection signal when the middle front detection sensor has detected a living body.

(3) In the power saving mode (tele), the transmission window is set in front of the M (middle) sensor. A long distance detection mode is set, i.e., the detection level is set to the highest sensitivity.

FIG. 10 shows an example of a detection signal when the middle front detection sensor has detected a living body.

[3. Configuration Example of Image Pickup Device]

Next, a configuration example of the image pickup device according to an embodiment of the present disclosure is described with reference to FIG. 11.

Figure 11:
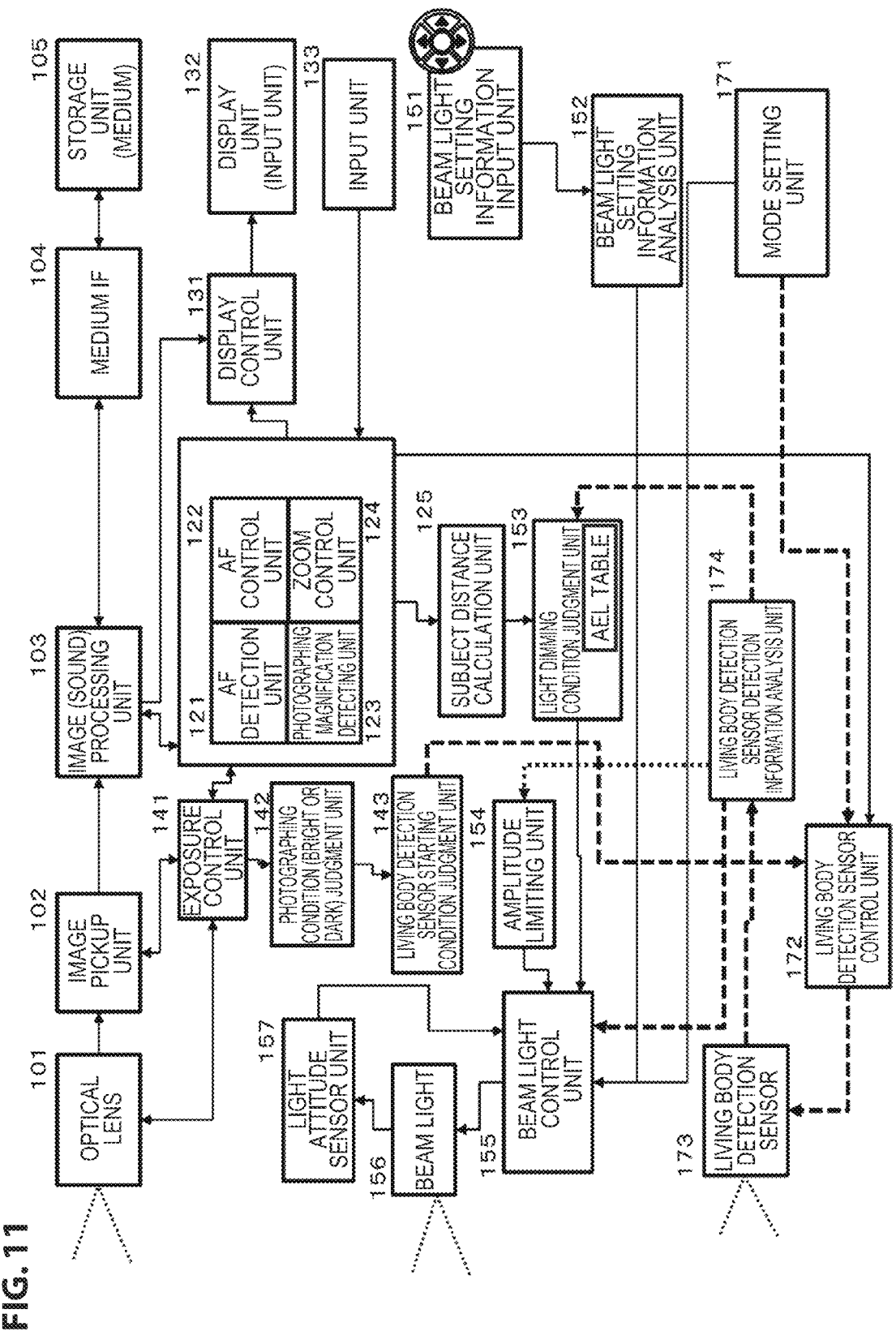
FIG. 11 is a view for explaining a configuration example of an image pickup device.

FIG. 11 is a block diagram illustrating the configuration of the image pickup device.

The image pickup device is a camera capable of photographing a still image and a moving image. In photographing a still image or a moving image, the image is photographed while irradiating a specific region with a spotlight by turning on a beam light.

An optical lens 101 is constituted by a focus lens, a zoom lens, and the like. The position of the focus lens is detected by an AF (autofocus) control unit 122. The position of the zoom lens is detected by a zoom control unit 124.

An image pickup unit 102 is constituted by, for example, an image pickup device of photographing an image entering through the optical lens 101. In photographing with visible light, a CMOS or CCD imager is used. In the case of photographing with infrared light, a CMOS or CCD imager from which an infrared cut filter and a luminosity correction filter are mechanically removed is used. Moreover, an image intensifier or a thermal image pickup device of a night-vision camera can also be utilized.

The image pickup device has high-density pixels of several 100,000 or more pixels, for example. However, it is common to perform resizing processing of reducing the number of pixels, and then generating a record image on a recording medium or an image to be displayed on a display unit. Specifically, images of 1920 rows×1080 columns, 3860 rows×2140 columns, 4912 rows×3264 columns, and the like are generated based on a picked-up image, recorded on a recording medium, and then displayed on a display unit 132, for example.

The image pickup unit 102 has each control function of exposure control (EC) and color control (CC). In the exposure control, the exposure brightness is controlled in conjunction with an AGC gain amplifier of an image pickup device output and an IRIS diaphragm (several stages) built in an optical lens unit. The image pickup unit 102 has a configuration in which the exposure can be adjusted in conjunction with a setting of a mechanical shutter speed and an electronic moving image frame rate of an image pickup device In the color control, color temperature adjustment, color reproducibility adjustment, and the like are performed, for example.

An image (sound) processing unit 103 performs various kinds of processing, such as resizing processing of photographed images and coding processing of images and sounds. The resizing processing is resizing processing for generating a record image on a recording medium and an image to be displayed on a display unit as described above. For example, moving images, such as a full HD moving image of H1920 rows×V1080 columns, a 16:9 4K UHD (Ultra HD) moving image of H3860 rows×V2140 columns, a 16:9 8K UHD moving image of H7680 rows×V4320 columns, and a moving image of H4912 rows×V3264 columns, are generated.

The coding processing is processing for generating coded data to be recorded on a recording medium.

The image (sound) processing unit 103 generates record data, such as a YCbCr signal, by image processing to RAW data to be input from the image pickup unit 102. In the processing, each signal processing, such as gamma correction, sharpness adjustment, and noise reduction, is performed.

The image (sound) processing unit 103 generates a video image whose size is further reduced for AF (autofocus) detection in an AF detection unit 121. The AF detection unit 121 performs AF detection of judging the focus position utilizing the reduced image.

A medium IF 104 records a stream signal containing the image signal and the audio signal processed in the image (sound) processing unit 103 in a storage unit (recording medium) 105, and then reads out the record data in the storage unit 105.

A photographing magnification detecting unit 123 detects the zoom magnification based on position data of the zoom lens. Moreover, the photographing magnification detecting unit 123 performs processing of inputting electronic zoom magnification information data in connection with the resizing processing from the image processing unit 103, and then calculating photographing magnification data, for example.

The zoom control unit 124 generates a control signal which controls a zoom lens actuator 114 to actuate the zoom lens. Moreover, the zoom control unit 124 outputs an electronic zoom control signal to be applied to the resizing processing performed by the image (sound) processing unit 103.

Moreover, the zoom control unit 124 judges the angle of view of a photographed image according to the zoom lens position, and then outputs information of the angle of view.

The focus lens position data and the image data for AF detection are input into the AF detection unit 121, and then a focus state of a current video image is detected by a contrast AF method employing a hill climbing method, for example. When the focus state is judged, a focus state judgment signal is output to a display control unit 131.

The AF control unit 122 judges whether or not a video image is in focus in a focus judgment unit while performing signal comparison processing of the AF detection signal history of the AF detection unit 121 according to a prescribed AF judgment algorithm. When it is judged based on the AF detection results that the image is not in focus, the focus lens actuator 113 is controlled to perform autofocus control of moving the focus lens.

The display control unit 131 performs control for displaying an image to be input through the optical lens 101 on the display unit 132. Furthermore, the display control unit 131 performs control of displaying the execution state of the focus control by computer graphics (CG). When it is judged in the AF control unit 122 that the image is in focus, CG generation processing for displaying, for example, a green frame, which shows the image is in focus, and the like are performed.

The AF detection unit 121 may be configured to perform focus detection utilizing a phase difference sensor.

A subject distance calculation unit 125 calculates the subject distance based on the focus lens position and the zoom lens position.

The subject distance calculation processing performed by the subject distance calculation unit 125 is described with reference to FIG. 12. The subject distance can be calculated from the positions of the focus lens and the zoom lens of the image pickup device 10.

Figure 12:
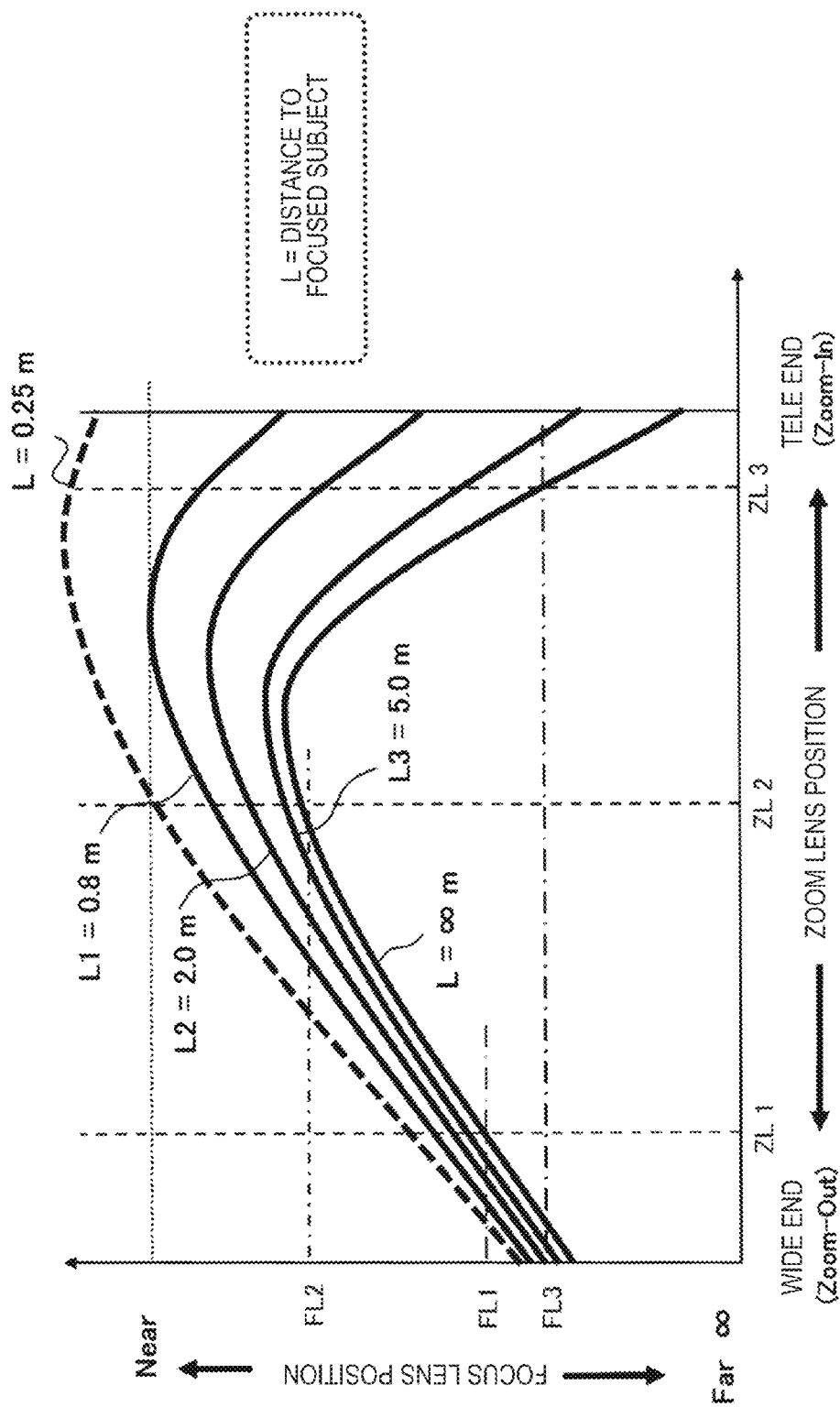
FIG. 12 is a view for explaining calculation processing of a subject distance.

A graph shown in FIG. 12 represents the following axes:
the horizontal axis representing the zoom lens position (Wide end to Tele end); and
the vertical axis representing the focus lens position (Far (infinite) to Near).

Each curve represents a subject distance L.

FIG. 12 shows a plurality of curves of Subject distance L=0.25 to infinity ($\infty$).

As shown in this graph, the focused subject distance L can be uniquely determined based on the zoom lens position and the focus lens position.

Returning to FIG. 11, a description of the configuration of the image pickup device is continued.

The subject distance calculated by the subject distance calculation unit 125 is output to a light dimming condition judgment unit 153. The light dimming condition judgment unit 153 sets the upper limit of the light emission level of the beam light to a safe level according to the subject distance. For the light dimming condition judgment processing, an AEL table is utilized. The AEL table is a table of specifying the safe accessible emission limit for laser light. The table is described in the latter part with reference to FIG. 14.

The display unit 132 displays an image to be input through the optical lens 101.

An input unit 133 is an input unit of performing a user's input for a shutter, a photographing start switch, a setting of various photographing parameters, a mode setting, and the like. A touch panel serving also as the display unit 132 also functions as the input unit.

An exposure control unit 141 controls exposure according to the photographing environment or controls exposure according to an input from the input unit 133.

Exposure control information is output to a photographing condition (bright or dark) judgment unit 142. The photographing condition (bright or dark) judgment unit 142 judges whether the photographing environment is bright or dark according to the exposure setting. The judgment information is output to a living body detection sensor starting condition judgment unit 143.

When it is judged that the photographing environment is dark, the living body detection sensor starting condition judgment unit 143 outputs a starting signal of a living body detection sensor 173 to a living body detection sensor control unit 172.

When the photographing environment is bright, it is meaningless to emit a beam light 156, so that the beam light 156 is not emitted. Therefore, a detection signal of the living body detection sensor 173 is not utilized for beam light control. Therefore, there is no necessity of operating the living body detection sensor 173.

On the other hand, when the photographing environment is dark, only a subject region can be made bright by the light emission of the beam light 156, and therefore beam light is emitted. In this case, a necessity of performing the beam light control according to detection information of the living body detection sensor 173 arises.

Thus, the photographing condition (blight or dark) judgment unit 142 judges whether the photographing environment is bright or dark according to the exposure setting, and then the judgment information is output to the living body detection sensor starting condition judgment unit 143.

The living body detection sensor starting condition judgment unit 143 starts the living body detection sensor 173 when photographing is performed under a dark environment, and therefore photographing utilizing a beam light may be performed.

A beam light setting information input unit 151 is a user input unit for setting the setting direction, the light distribution angle, the light intensity (output level), and the like of a beam light 156.

The setting information is analyzed in a beam light setting information analysis unit 152, and then the analysis information is output to a beam light control unit 155.

The beam light control unit 155 controls the direction, the light distribution angle, the output level, and the like of the beam light 156 according to the analysis information.

The beam light control unit 155 continuously performs feedback control for maintaining the position of the beam light at a predetermined position according to attitude information of the beam light 156 to be detected by a light attitude sensor unit 157.

A configuration example of a beam light directivity angle actuator which is one of the control mechanisms of the beam light control unit 155 is described with reference to FIG. 13.

Figure 13:
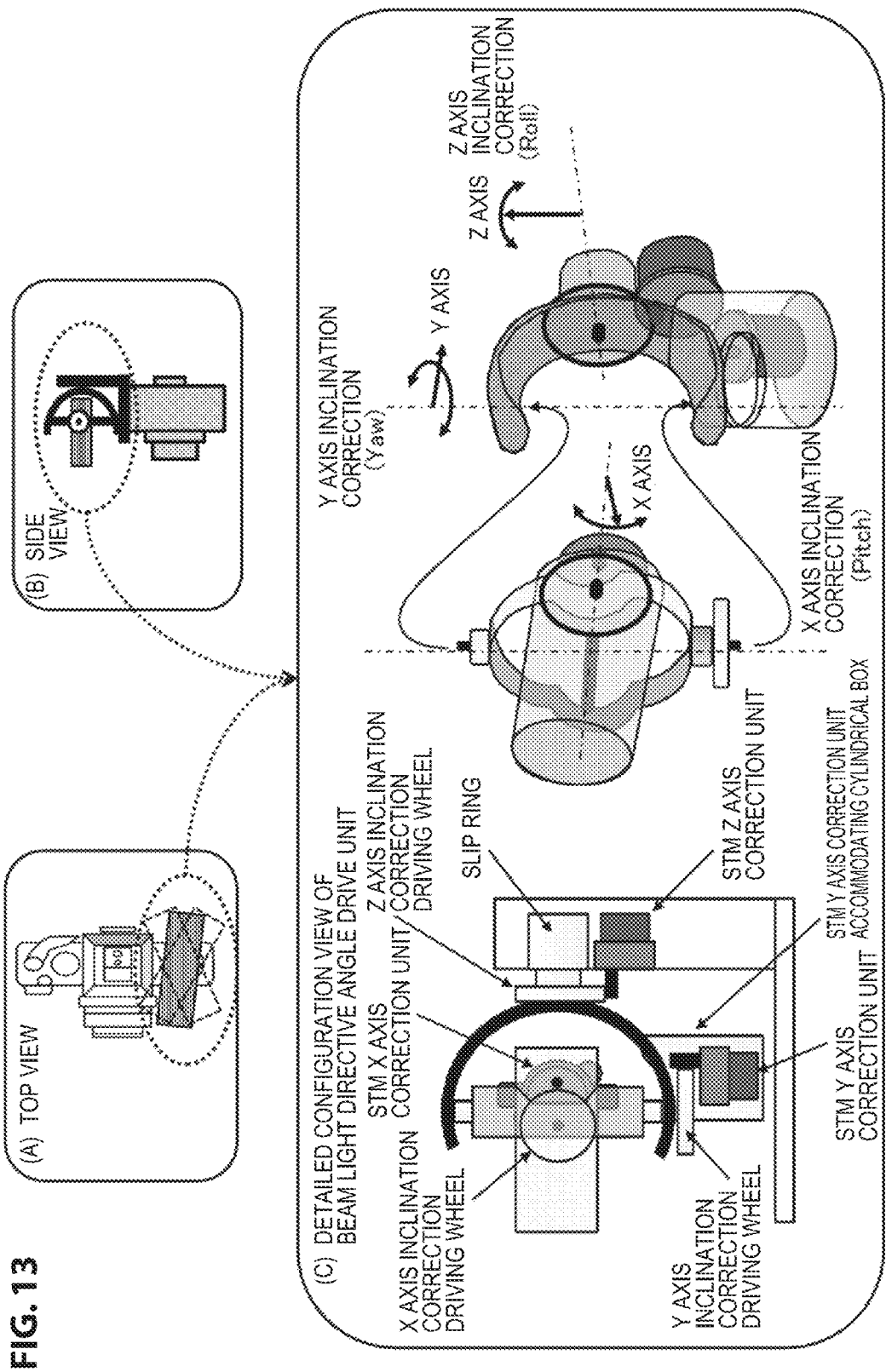
FIG. 13 includes FIGS. 13(A), 13(B), and 13(C) which are views for explaining a beam light directivity angle control mechanism in a beam light control unit.

FIG. 13 illustrates the following views:
(A) Top view of a camera having a beam light;
(B) Side view of a camera having a beam light; and
(C) Detailed configuration view of a beam light directivity angle actuator.

As shown in the detailed configuration view of a beam light directivity angle actuator (C), the beam light directivity angle actuator has an attitude stabilization drive mechanism by a general-purpose three-axis gimbal structure.

The attitude is stabilized by a G acceleration sensor and swaying is prevented by a Gyro angular velocity sensor. The Z axis is set to be usually directed in the gravity direction shown by a G sensor.

With respect to the inclination stability of the X axis and the Y axis, stabilization control is performed in such a manner as to maintain the initially set angle and direction.

As illustrated in FIG. 13(C), the beam light directivity angle actuator has the following constituent units:
an X axis inclination correction driving wheel of performing X axis inclination correction;
a Y axis inclination correction driving wheel of performing Y axis inclination correction;
a Z axis inclination correction driving wheel of performing Z axis inclination correction;
a stepping motor (STM) X axis correction unit of performing X axis correction by stepping motor (STM) drive;
a stepping motor (STM) Y axis correction unit of performing Y axis correction by stepping motor (STM) drive; and
a stepping motor (STM) Z axis correction unit of performing Z axis correction by stepping motor (STM) drive, and performs attitude stabilization drive by the three-axis gimbal structure.

A reason for correcting the Z axis inclination lies in lighting an optical design, such as a beam light illumination light shape and color, in an erect manner. The reason also lies in the fact that, since the inclination correction of each of the X axis and the Y axis is mechanically performed by motor drive, when the Z axis direction inclination is detected from the step driving quantity of each of the X axis direction inclination correction and the Y axis direction inclination correction, and then the Z axis inclination correction is shared by Z axis inclination correction motor drive, which affects a Z axis inclination vector, X-Z vector and Y-Z vector operation control complicated for the motor drive is simplified, and dealing of each of X axis direction inclination detection information data and Y axis direction inclination detection information data from a sensor is shared by X axis inclination correction motor drive and Y axis inclination correction motor drive, respectively, and thus the entire drive system control is simplified.

Returning to FIG. 11, a description of the configuration of the image pickup device is continued.

A mode setting unit 171 is a mode setting unit of setting the manner mode previously described with reference to FIG. 6 and the power saving mode previously described with reference to FIG. 7.

The setting mode information of the mode setting unit 171 is output to the living body detection sensor control unit 172 and the beam light control unit 155.

The beam light control unit 155 and the living body detection sensor control unit 172 perform control of the beam light and control of the living body detection sensor 173 according to the setting mode.

For example, the living body detection sensor control unit 172 performs, for example, processing of validating the left and right (LR) sensors as described with reference to FIG. 6 when the manner mode is set and processing of validating the middle (M) sensor when the power saving mode is set as described with reference to FIG. 7.

Moreover, the living body detection sensor control unit 172 also performs, for example, processing of changing a transmission region of a far-infrared light filter according to the mode setting.

Furthermore, the living body detection sensor control unit 172 inputs zoom setting information from the zoom control unit 124, and changes the setting of the sensor detection region depending on the setting, i.e., a case of the tele-setting and a case of the wide setting. The changing is performed as described with reference to FIG. 9, FIG. 10, and the like.

The changing is performed by the processing of changing the transmission region of a far-infrared light filter.

The detection information of the living body detection sensor 173 is output to the living body detection sensor detection information analysis unit 174, and then analyzed.

The analysis information is output to an amplitude limiting unit 564 and the light dimming condition judgment unit 153.

When the manner mode is set, for example, and a person has been detected with either one of the left and right (LR) sensors by the living body detection sensor 173, the amplitude limiting unit 564 generates amplitude limiting information of the beam light 156 in such a manner as not to direct the beam light 156 in the detection direction, and then outputs the same to the beam light control unit 155.

The beam light control unit 155 controls the directivity direction of the beam light 156 according to the amplitude limiting information.

The light dimming condition judgment unit 153 basically sets the upper limit of the light emission level of the beam light to a safe level according to the subject distance. Furthermore, when a living body has been detected from the living body detection sensor detection information analysis unit 174 when the manner mode is set, the light dimming condition judgment unit 153 performs processing of further increasing the safety and reducing the upper limit of the light emission level of the beam light. For the light dimming condition judgment processing, an AEL table is utilized.

The AEL table is described with reference to FIG. 14.

The AEL table is a table of specifying the safe accessible emission limit of laser light.

The accessible emission limit (AEL) of laser light is set to laser light of a coherent light dangerous to eyes, and the accessible emission limit according to wavelength light is specified.

Figure 14:
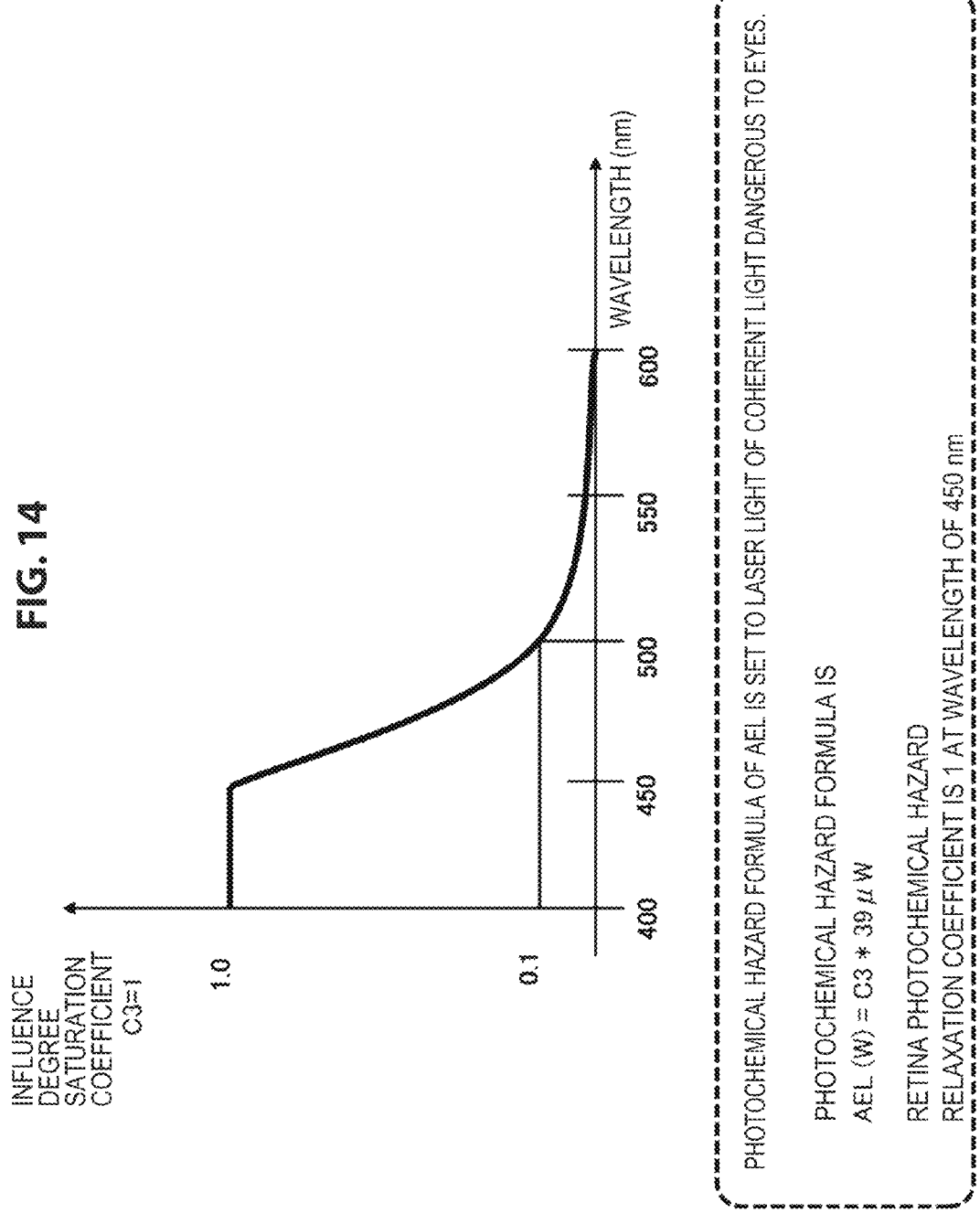
FIG. 14 is a view for explaining an accessible emission limit (AEL) table.

Specifically, the accessible emission limit shown in the graph illustrated in FIG. 14 is specified.

The light dimming condition judgment unit 153 determines an output light level in such a manner that the light emission level of the beam light 156 is set to be sufficiently lower than a dangerous level based on the AEL table shown in FIG. 14, for example.

The light distribution angle which specifies the spread of irradiation light of the beam light according to the output level is also determined. This is because the light level intensity per area varies depending on the light distribution angle. The determined information is output to the beam light control unit 155, and then the beam light control unit 155 controls an output of the beam light in such a manner that the output light level is equal to or less than the determined output light level.

[4. Processing Sequence Performed by Image Pickup Device According to Embodiment of Present Disclosure]

Next, a processing sequence to be performed by the image pickup device according to an embodiment of the present disclosure is described with reference to FIG. 15 and the following drawings while being matched with the processing of each processing unit of the image pickup device illustrated in FIG. 11.

Figure 16:
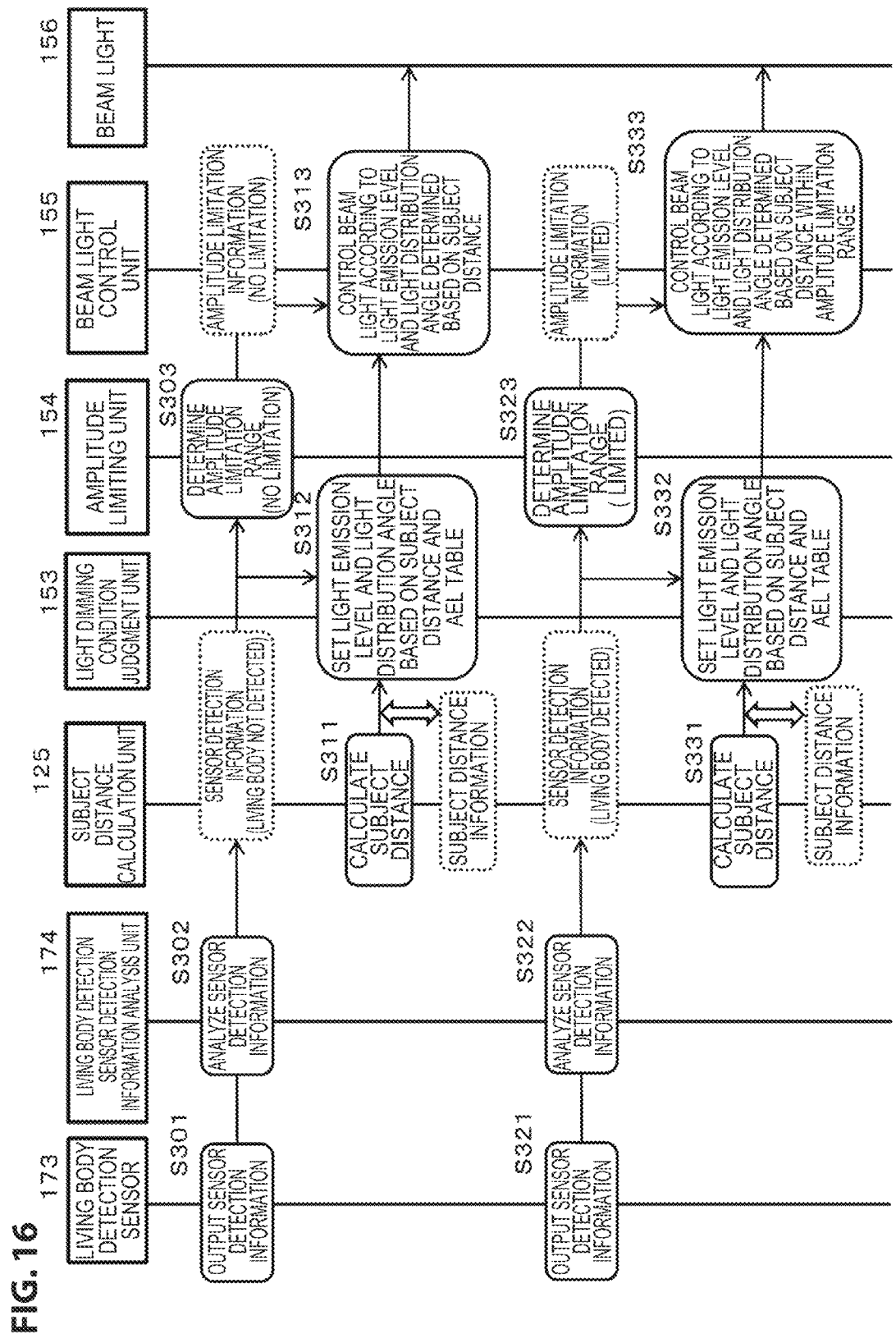
FIG. 16 is a sequence diagram for explaining processing performed by an image pickup device according to an embodiment of the present disclosure when the manner mode is set.
Figure 17:
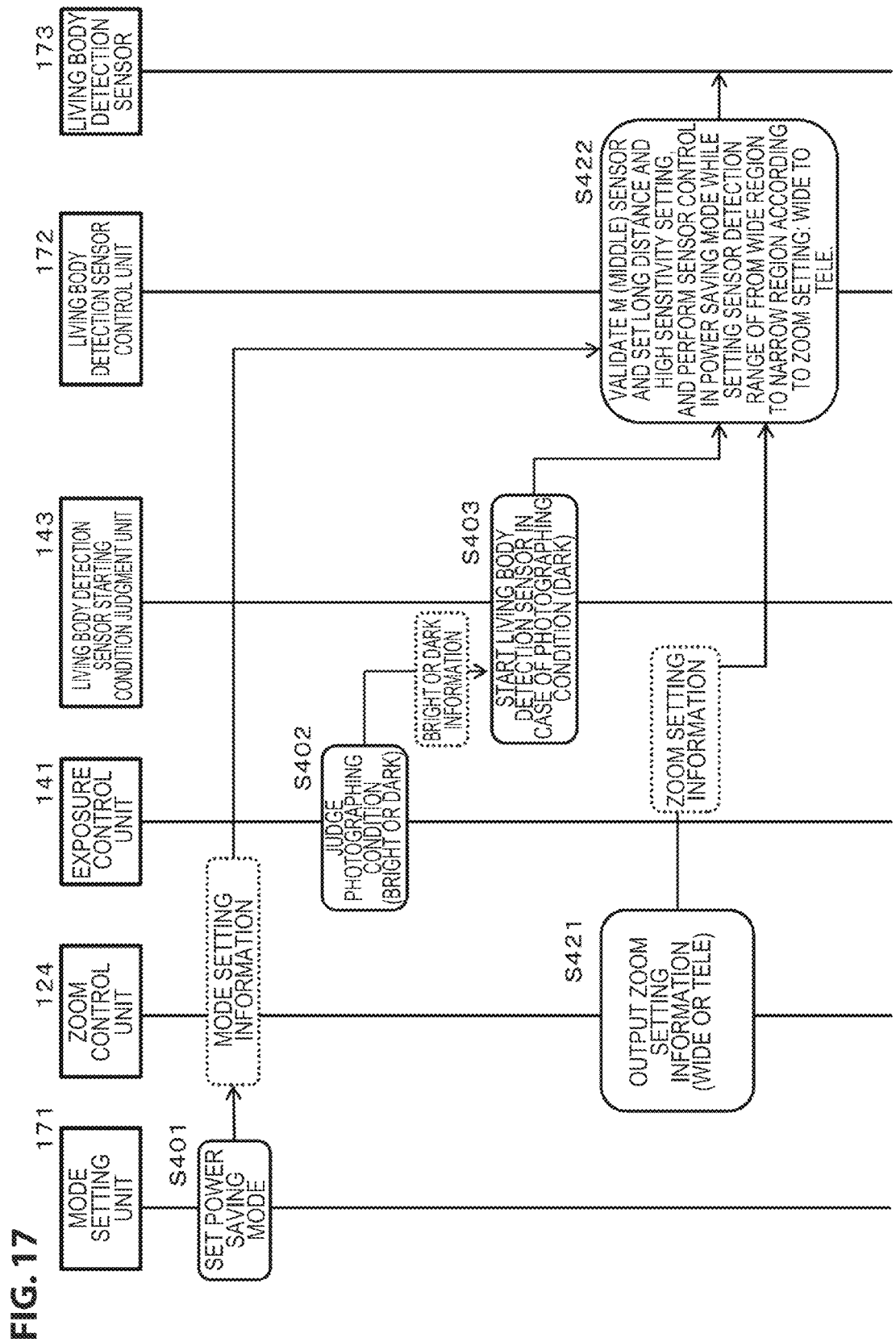
FIG. 17 is a sequence diagram for explaining processing performed by an image pickup device according to an embodiment of the present disclosure when the power saving mode is set.
Figure 18:
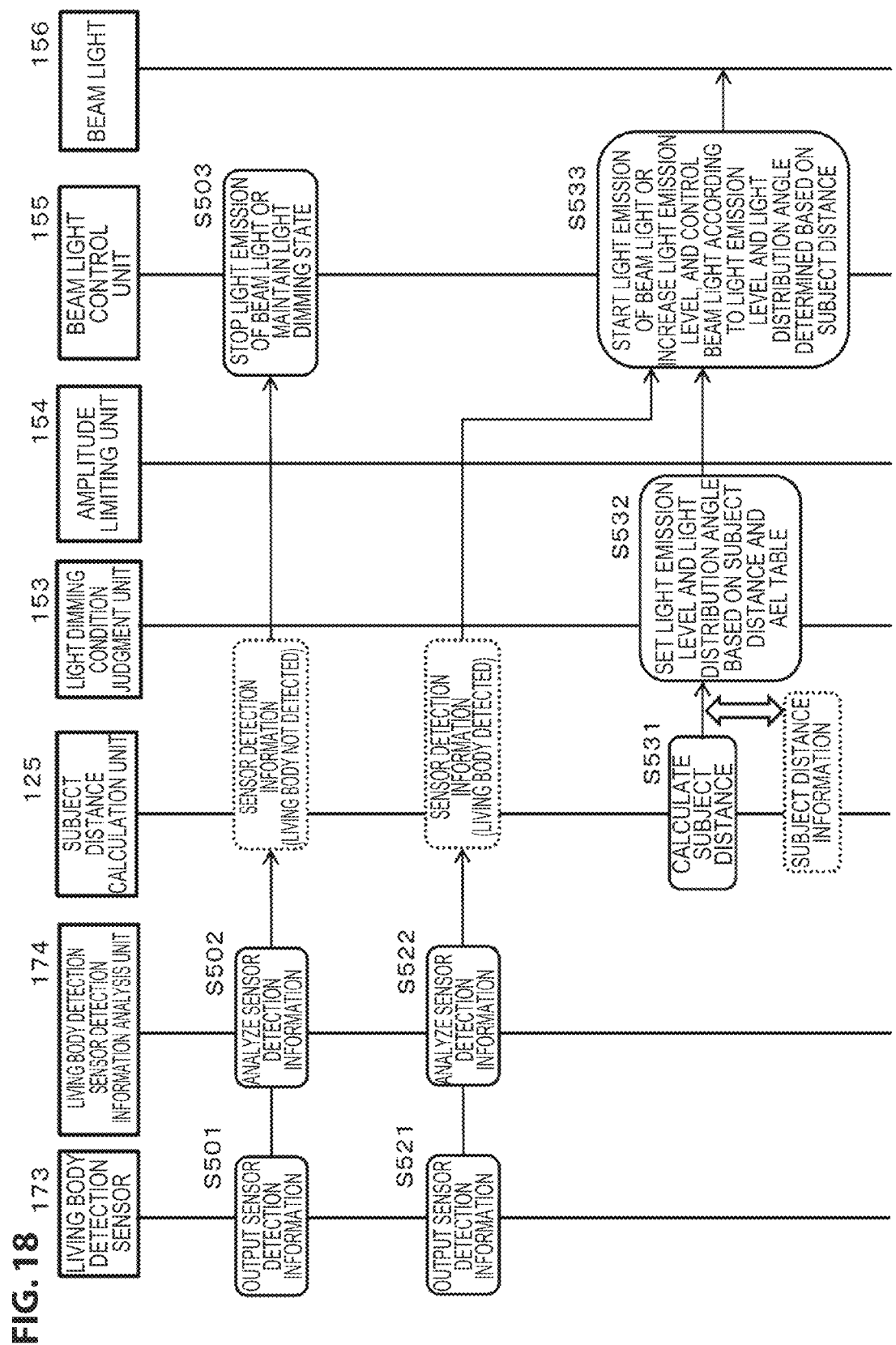
FIG. 18 is a sequence diagram for explaining processing performed by an image pickup device according to an embodiment of the present disclosure when the power saving mode is set.

The following two setting modes are described one by one:

(1) Processing sequence example when the manner mode is set (FIG. 15, FIG. 16); and
(2) Processing sequence example when the power saving mode is set (FIG. 17, FIG. 18).

[4-1. Processing Sequence Example when Manner Mode is Set]

First, a processing sequence example when the manner mode is set is described with reference to FIGS. 15 and 16.

FIG. 15 illustrates the processing units of the mode setting unit 171, the zoom control unit 124, the exposure control unit 141, the living body detection sensor starting condition judgment unit 143, the living body detection sensor control unit 172, and the living body detection sensor 173 from the left. These units correspond to the processing units of the image pickup device illustrated in FIG. 11.

Hereinafter, the processing sequence when the manner mode is set is described one by one in each step.

(Step S201)

In Step S201, a user sets the manner mode through the mode setting unit 171.

The mode setting information is input into the living body detection sensor control unit 172.

(Step S202)

In Step S202, the exposure control unit 141 performs photographing condition (bright or dark) judgment processing based on an exposure setting, and then outputs the judged bright or dark information to the living body detection sensor starting condition judgment unit 143.

(Step S203)

Next, in Step S203, when the photographing condition is dark, the living body detection sensor starting condition judgment unit 143 outputs a starting command for starting the living body detection sensor to the living body detection sensor control unit 172.

(Step S204)

Next, in Step S204, the living body detection sensor control unit 172 starts the living body detection sensor 173 under the condition that the starting command has been input from the living body detection sensor starting condition judgment unit 143.

In this processing, a detection region, a sensitivity level, and the like of the living body detection sensor are set according to the mode setting information set through the mode setting unit 171.

Specifically, a transmission window is set under the LR (left and right) sensors in the manner mode as previously described with reference to FIG. 10, for example. Moreover, a short distance detection mode is set, i.e., the detection level is set to low sensitivity.

Next, a sequence after starting the living body detection sensor 173 when the manner mode is set is described with reference to a sequence diagram illustrated in FIG. 16.

FIG. 16 illustrates the living body detection sensor 173, the living body detection sensor detection information analysis unit 174, the subject distance calculation unit 125, the light dimming condition judgment unit 153, the amplitude control unit 154, the beam light control unit 155, and the beam light 156 from the left. These processing units correspond to the processing units of the image pickup device illustrated in FIG. 11 described above.

Hereinafter, a sequence after starting the living body detection sensor 173 when the manner mode is set is described one by one in each step.

Processing of each of Steps S301 to S313 is processing in the state where the living body detection sensor 173 has not detected a person. Each of Steps S321 to S324 is processing when the living body detection sensor 173 has detected a living body (person).

(Step S301)

In Step S301, the living body detection sensor 173 outputs sensor information which shows that a living body has not been detected to the living body detection sensor detection information analysis unit 174.

(Step S302)

In Step S302, the living body detection sensor detection information analysis unit 174 outputs sensor detection information which shows that a living body has not been detected to the light dimming condition judgment unit 153 and the amplitude limiting unit 154 based on the input from the living body detection sensor 173.

(Step S303)

In Step S303, the amplitude limiting unit 154 outputs amplitude limiting information which shows that the amplitude is not limited to the beam light control unit 155 based on the sensor detection information which shows that a living body has not been detected.

(Step S311)

The subject distance calculation unit 125 calculates the distance to a subject to be photographed by the image pickup device. This processing is the processing previously described with reference to FIG. 12 and the other drawings and includes calculating the subject distance based on the focus lens position and the zoom lens position.

The calculated subject distance information is output to the light dimming condition judgment unit 153.

(Step S312)

In Step S312, the light dimming condition judgment unit 153 sets the upper limit of the light emission level of the beam light to a safe level according to the subject distance utilizing the AEL table previously described with reference to FIG. 14. The light distribution angle which specifies the spread of the irradiation light of the beam light according to the output level is also determined. This is because the light level intensity per area varies depending on the light distribution angle. The determined information is output to the beam light control unit 155.

(Step S313)

In Step S313, the beam light control unit 155 controls the beam light 156 according to the input information from the amplitude limiting unit 154 and the input information from the light dimming condition judgment unit 153.

Specifically, since the input information which shows that the amplitude is not limited is obtained from the amplitude limiting unit 154, the beam light 156 is set in a direction according to a user's direction.

Furthermore, the output level and the light distribution angle of the beam light 156 are set according to the output level, the output level equal to or less than the upper limit, and the light distribution angle information input from the light dimming condition judgment unit 153.

Thereafter, feedback control for maintaining the attitude of the beam light 156 is performed based on attitude information successively input from the light attitude sensor unit 157.

(Step S321)

In Step S 321 and the following steps, a processing sequence when a person has been detected by the living body detection sensor 173 is performed.

In Step S321, the living body detection sensor 173 outputs sensor information which shows that a living body has been detected to the living body detection sensor detection information analysis unit 174.

(Step S322)

In Step S322, the living body detection sensor detection information analysis unit 174 outputs sensor detection information which shows that a living body has been detected to the light dimming condition judgment unit 153 and the amplitude limiting unit 154 based on the input from the living body detection sensor 173.

(Step S323)

In Step S323, the amplitude limiting unit 154 outputs amplitude limiting information which shows that the amplitude is limited in such a manner as not to direct the beam light in the direction where a living body has been detected to the beam light control unit 155 based on the sensor detection information which shows that a living body has been detected.

(Step S331)

The subject distance calculation unit 125 calculates the distance to the subject to be photographed by the image pickup device. This processing is the processing previously described with reference to FIG. 12 and the like and includes calculating the subject distance based on the focus lens position and the zoom lens position.

The calculated subject distance information is output to the light dimming condition judgment unit 153.

(Step S332)

In Step S332, the light dimming condition judgment unit 153 sets the upper limit of the light emission level of the beam light to a sage level according to the subject distance utilizing the AEL table previously described with reference to FIG. 14. The light distribution angle which specifies the spread of the irradiation light of the beam light according to the output level is also determined. This is because the light level intensity per area varies depending on the light distribution angle. The determined information is output to the beam light control unit 155.

A level lower than the usual output level may be set as the upper limit based on the information which shows that a living body has been detected.

(Step S333)

In Step S333, the beam light control unit 155 controls the beam light 156 according to the input information from the amplitude limiting unit 154 and the input information from the light dimming condition judgment unit 153.

Specifically, since the input information which shows that the amplitude is limited for avoiding a setting of the direction of the beam light to the direction in which a living body has been detected is obtained from the amplitude limiting unit 154, the direction of the beam light is controlled according to the amplitude limitation.

Furthermore, the output level and the light distribution angle of the beam light 156 are set according to the output level, the output level equal to or less than the upper limit, and the light distribution angle information input from the light dimming condition judgment unit 153.

Thereafter, feedback control for maintaining the attitude of the beam light 156 is performed based on attitude information successively input from the light attitude sensor unit 157.

[4-2. Processing Sequence Example when Power Saving Mode is Set]

Next, a processing sequence when the power saving mode is set is described with reference to FIG. 17 and FIG. 18.

FIG. 17 illustrates the processing units of the mode setting unit 171, the zoom control unit 124, the exposure control unit 141, the living body detection sensor starting condition judgment unit 143, the living body detection sensor control unit 172, and the living body detection sensor 173 from the left. These processing units correspond to the processing units of the image pickup device illustrated in FIG. 11.

Hereinafter, the processing sequence when the power saving mode is set is described one by one in each step.

(Step S401)

In Step S401, a user sets the power saving mode through the mode setting unit 171.

The mode setting information is input into the living body detection sensor control unit 172.

(Step S402)

In Step S402, the exposure control unit 141 performs the photographing condition (bright or dark) judgment processing based on an exposure setting, and then outputs the judged bright or dark information to the living body detection sensor starting condition judgment unit 143.

(Step S403)

Next, in Step S403, when the photographing condition is dark, the living body detection sensor starting condition judgment unit 143 outputs a starting command for starting the living body detection sensor to the living body detection sensor control unit 172.

(Step S421)

Next, in Step S421, the zoom control unit 124 outputs zoom setting information to the living body detection sensor control unit 172.

More specifically, the information shows that the zoom setting is the wide setting or the tele-setting.

(Step S422)

Next, in Step S422, the living body detection sensor control unit 172 starts the living body detection sensor 173 under the condition that the starting command has been input from the living body detection sensor starting condition judgment unit 143.

In this processing, the zoom control unit 124 sets a detection region, a sensitivity level, and the like of the living body detection sensor according to the mode setting information set through the mode setting unit 171 and the zoom setting information.

Specifically, the setting is performed as follows as previously described with reference to FIG. 10, for example.

In the case of the power saving mode and the wide photographing mode, the transmission window is set in front of the M (middle) sensor. Moreover, a long distance detection mode is set, i.e., the detection level is set to high sensitivity.

In the case of the power saving mode and the tele-photographing mode, the transmission window is set in front of the M (middle) sensor. A long distance detection mode is set, i.e., the detection level is set to the highest sensitivity.

Next, a sequence after starting the living body detection sensor 173 when the power saving mode is set is described with reference to the sequence diagram shown in FIG. 18.

FIG. 18 illustrates the living body detection sensor 173, the living body detection sensor detection information analysis unit 174, the subject distance calculation unit 125, the light dimming condition judgment unit 153, the amplitude control unit 154, the beam light control unit 155, and the beam light 156 from the left. These processing units correspond to the processing units of the image pickup device illustrated in FIG. 11 described above.

Hereinafter, a sequence after starting the living body detection sensor 173 starting when the power saving mode is set is described one by one in each step.

Processing of each of Steps S501 to S503 is processing in the state where the living body detection sensor 173 has not detected a living body. Processing of each of Steps S521 to S533 is processing when the living body detection sensor 173 has detected a living body.

(Step S501)
In Step S501, the living body detection sensor 173 outputs sensor information which shows that a living body has not been detected to the living body detection sensor detection information analysis unit 174.

(Step S502)
In Step S502, the living body detection sensor detection information analysis unit 174 outputs sensor detection information which shows that a living body has not been detected to the beam light control unit 155 based on the input from the living body detection sensor 173.

(Step S503)
In Step S503, the beam light control unit 155 stops the light emission of the beam light or maintaining a light dimming state based on the sensor detection information which shows that a living body has not been detected.

(Step S521)
In Step S521 and the following steps, a processing sequence when a living body has been detected by the living body detection sensor 173 is performed.

In Step S521, the living body detection sensor 173 outputs sensor information which shows that a living body has been detected to the living body detection sensor detection information analysis unit 174.

(Step S522)
In Step S522, the living body detection sensor detection information analysis unit 174 outputs sensor detection information which shows that a living body has been detected to the beam light control unit 155 based on the input from the living body detection sensor 173.

(Step S531)
The subject distance calculation unit 125 calculates the distance to the subject to be photographed by the image pickup device. This processing is the processing previously described with reference to FIG. 12 and the other drawings and includes calculating the subject distance based on the focus lens position and the zoom lens position.

The calculated subject distance information is output to the light dimming condition judgment unit 153.

(Step S532)
In Step S532, the light dimming condition judgment unit 153 sets the upper limit of the light emission level of the beam light to a safe level according to the subject distance utilizing the AEL table previously described with reference to FIG. 14. The light distribution angle which specifies the spread of the irradiation light of the beam light according to the output level is also determined. This is because the light level intensity per area varies depending on the light distribution angle. The determined information is output to the beam light control unit 155.

(Step S533)
In Step S533, the beam light control unit 155 controls the beam light 156 from the input information which shows that a living body has been detected from the living body detection sensor detection information analysis unit 174 and the input information from the light dimming condition judgment unit 153.

Specifically, processing of starting the light emission of the beam light or increasing the output level thereof is performed.

In this processing, the output level and the light distribution angle of the beam light 156 are set according to the output level, the output level equal to or less than the upper limit, and the light distribution angle information input from the light dimming condition judgment unit 153.

Thereafter, feedback control for maintaining the attitude of the beam light 156 is performed based on the attitude information successively input from the light attitude sensor unit 157.

[5. Conclusion of Configuration According to Embodiment of Present Disclosure]

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below.

(1) An image pickup device including:
   an image pickup unit; and
   a beam light control unit configured to control a state of a beam light based on living body detection information given by a living body detection unit.

(2) The image pickup device according to (1), further including:
   a living body detection control unit configured to change a sensor detection region of the living body detection unit.

(3) The image pickup device according to (1) or (2),
wherein the living body detection control unit sets the sensor detection region to at least one of a left front region and a right front region of the image pickup device.
(4) The image pickup device according to any one of (1) to (3),
wherein, when the living body detection information shows detection of a living body, the beam light control unit sets a direction of the beam light in a direction different from a direction in which the living body is detected.
(5) The image pickup device according to any one of (1) to (4),
wherein, when the living body detection information shows detection of a living body, the beam light control unit stops light emission of the beam light or reduces a light emission level of the beam light.
(6) The image pickup device according to any one of (1) to (5),
wherein the living body detection control unit sets a sensor detection level of the living body detection unit to be less than predetermined sensitivity.
(7) The image pickup device according to any one of (2) to (6),
wherein the living body detection control unit sets the sensor detection region to a middle front region of the image pickup device.
(8) The image pickup device according to any one of (2) to (7),
wherein, when the living body detection information shows detection of a living body, the beam light control unit starts light emission of the beam light or increases a light emission level of the beam light.
(9) The image pickup device according to (2),
wherein the living body detection control unit sets a sensor detection level of the living body detection unit to be higher than predetermined sensitivity.
(10) The image pickup device according to any one of (1) to (9),
wherein the living body detection unit is constituted by a far-infrared light detection sensor.
(11) The image pickup device according to (10),
wherein the living body detection unit has a far-infrared light filter capable of controlling a transmission region of far-infrared light in front of the far-infrared light detection sensor.
(12) The image pickup device according to (11), further including:
a living body detection control unit configured to change the transmission region of the far-infrared light filter.
(13) The image pickup device according to (12),
wherein the living body detection control unit sets the sensor detection region to be wider in a wide mode than in a tele-mode by controlling the transmission region of the far-infrared light filter.
(14) The image pickup device according to any one of (1) to (13), further including:
a light dimming condition judgment unit configured to determine an upper limit of a light emission level of the beam light according to a subject distance.
(15) The image pickup device according to any one of (1) to (14),
wherein the living body detection control unit changes the sensor detection region according to a mode of a manner mode or a power saving mode.
(16) A light projection device including:
a beam light configured to emit light,
wherein a state of the beam light is controlled based on living body detection information given by a living body detection unit.
(17) A beam light control method including:
controlling a state of beam light based on living body detection information given by a living body detection unit.
(18) A non-transitory computer readable medium storing a program causing a computer to execute a method of controlling a beam light control apparatus, the method including:
controlling a state of beam light based on living body detection information given by a living body detection unit.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

As described above, according to the configuration of one Example according to an embodiment of the present disclosure, prevention of beam light emission to a person and power saving are realized by controlling the direction and the light emission level of the beam light provided in the camera based on the living body detection information.

Specifically, the beam light control unit performs at least any one of the directive direction control, the light emission control, and the light emission level control of the beam light based on the living body detection information given by the living body detection sensor. When the manner mode is set, a living body, such as a human being, approaching the image pickup device is detected, and then the beam light is controlled so that the directive direction of the beam light is not set in a direction in which the living body has been detected and control of reducing the output level is performed. When the power saving mode is set, control of starting the light emission of the beam light or increasing the light emission level is performed based on a living body detection signal.

The present configuration realizes prevention of beam light emission to a human being and power saving by controlling the direction and the light emission level of the beam light provided in the camera based on the living body detection information.

What is claimed is:

1. An image pickup device, comprising:
an imager; and
one or more processors configured to:
change a sensor detection region of a sensor based on a mode of the image pickup device; and
control a state of a beam light based on living body detection information from the sensor,
wherein the one or more processors are further configured to set the sensor detection region to a left front region and a right front region of the image pickup device based on the mode that is a manner mode, and
wherein the one or more processors are further configured to set the sensor detection region to a middle front region of the image pickup device based on the mode that is a power saving mode.

2. The image pickup device according to claim 1, wherein the one or more processors are further configured to set a direction of the beam light in a direction different from a direction in which a living body is detected based on indication of detection of the living body in the living body detection information.

3. The image pickup device according to claim 2, wherein the one or more processors are further configured to stop light emission of the beam light based on the living body detection information that indicates the detection of the living body.

4. The image pickup device according to claim 1, wherein the one or more processors are further configured to set a sensor detection level to be less than a set sensitivity.

5. The image pickup device according to claim 1, wherein the one or more processors are further configured to control start of light emission of the beam light or increase a light emission level of the beam light based on living body detection information that indicates detection of a living body.

6. The image pickup device according to claim 1, wherein the one or more processors are further configured to set a sensor detection level to be higher than a set sensitivity.

7. The image pickup device according to claim 1, wherein the sensor is constituted by a far-infrared light detection sensor.

8. The image pickup device according to claim 7, wherein the sensor has a far-infrared light filter configured to control a transmission region of far-infrared light in front of the far-infrared light detection sensor.

9. The image pickup device according to claim 8, wherein the one or more processors are further configured to change the transmission region of the far-infrared light filter.

10. The image pickup device according to claim 9, wherein the one or more processors are further configured to set the sensor detection region to be wider in a wide mode than in a tele-mode by control of the transmission region of the far-infrared light filter.

11. The image pickup device according to claim 1, wherein the one or more processors are further configured to determine an upper limit of a light emission level of the beam light based on a subject distance.

12. The image pickup device according to claim 1 wherein the one or more processors are further configured to reduce a light emission level of the beam light based on the living body detection information that indicates detection of a living body.

13. A light projection device, comprising:
one or more processors configured to:
control emission of a beam light for an image pickup device,
wherein a state of the beam light is controlled based on living body detection information given from a sensor, and
wherein a sensor detection region of the sensor is set to a left front region and a right front region of the image pickup device based on a mode of the image pickup device that is a manner mode, and
wherein the sensor detection region is set to a middle front region of the image pickup device based on the mode of the image pickup device that is a power saving mode.

14. A beam light control method, comprising:
in an image pickup device:
changing a sensor detection region of a sensor based on a mode of the image pickup device; and
controlling a state of a beam light based on living body detection information from the sensor,
wherein a sensor detection region of the sensor is set to a left front region and a right front region of the image pickup device based on the mode that is a manner mode, and
wherein the sensor detection region is set to a middle front region of the image pickup device based on the mode that is a power saving mode.

15. A non-transitory computer-readable medium storing computer-executable instructions causing a computer to execute operations, the operations comprising:
in an image pickup device:
changing a sensor detection region of a sensor based on a mode of the image pickup device; and
controlling a state of a beam light based on living body detection information from the sensor,
wherein a sensor detection region of the sensor is set to a left front region and a right front region of the image pickup device based on the mode that is a manner mode, and
wherein the sensor detection region is set to a middle front region of the image pickup device based on the mode that is a power saving mode.

* * * * *